United States Patent
Fang et al.

(10) Patent No.: US 11,129,247 B2
(45) Date of Patent: Sep. 21, 2021

(54) LED LIGHTING SYSTEMS AND METHODS FOR CONSTANT CURRENT CONTROL IN VARIOUS OPERATION MODES

(71) Applicant: ON-BRIGHT ELECTRONICS (SHANGHAI) CO., LTD., Shanghai (CN)

(72) Inventors: Lieyi Fang, Shanghai (CN); Jun Zhou, Shanghai (CN)

(73) Assignee: On-Bright Electronics (Shanghai) Co., Ltd., Shanghai (CN)

(*) Notice: Subject to any disclaimer, the term of this patent is extended or adjusted under 35 U.S.C. 154(b) by 0 days.

(21) Appl. No.: 16/844,799

(22) Filed: Apr. 9, 2020

(65) Prior Publication Data
US 2020/0236757 A1 Jul. 23, 2020

Related U.S. Application Data

(60) Division of application No. 16/222,032, filed on Dec. 17, 2018, now Pat. No. 10,667,351, which is a (Continued)

(30) Foreign Application Priority Data

Nov. 15, 2011 (CN) .......................... 201110376439.0

(51) Int. Cl.
*H05B 45/10* (2020.01)
*H05B 45/14* (2020.01)
*H05B 45/375* (2020.01)

(52) U.S. Cl.
CPC ............. *H05B 45/10* (2020.01); *H05B 45/14* (2020.01); *H05B 45/375* (2020.01); *Y02B 20/30* (2013.01)

(58) Field of Classification Search
None
See application file for complete search history.

(56) References Cited

U.S. PATENT DOCUMENTS 5,497,119 A 3/1996 Tedrow et al.
6,069,458 A 5/2000 Takehara et al.
(Continued)

FOREIGN PATENT DOCUMENTS

CN 1806381 A 7/2006
CN 101039075 A 9/2007
(Continued)

OTHER PUBLICATIONS

Chinese Patent Office, Office Action dated Apr. 24, 2014, in Application No. 201210099930.8.
(Continued)

*Primary Examiner* — Amy Cohen Johnson
*Assistant Examiner* — James H Cho
(74) *Attorney, Agent, or Firm* — Faegre Drinker Biddle & Reath LLP

(57) ABSTRACT

System and method for providing at least an output current to one or more light emitting diodes. The system includes a control component configured to receive at least a demagnetization signal, a sensed signal and a reference signal and to generate a control signal based on at least information associated with the demagnetization signal, the sensed signal and the reference signal, and a logic and driving component configured to receive at least the control signal and output a drive signal to a switch based on at least information associated with the control signal. The switch is connected to a first diode terminal of a diode and a first inductor terminal of an inductor. The diode further includes a second diode terminal, and the inductor further includes a second inductor terminal.

5 Claims, 14 Drawing Sheets

Related U.S. Application Data division of application No. 15/812,933, filed on Nov. 14, 2017, now Pat. No. 10,314,130, which is a continuation of application No. 15/683,402, filed on Aug. 22, 2017, now Pat. No. 10,375,787, which is a continuation of application No. 15/055,366, filed on Feb. 26, 2016, now Pat. No. 9,794,997, which is a continuation of application No. 14/728,815, filed on Jun. 2, 2015, now Pat. No. 9,807,840, which is a division of application No. 13/331,860, filed on Dec. 20, 2011, now Pat. No. 9,084,317.

(56) References Cited

U.S. PATENT DOCUMENTS

| | | |
|---|---|---|
| 6,977,824 B1 | 12/2005 | Yang et al. |
| 7,061,780 B2 | 6/2006 | Yang et al. |
| 7,394,634 B2 | 7/2008 | Fang et al. |
| 7,535,736 B2 | 5/2009 | Nakamura et al. |
| 7,869,229 B2 | 1/2011 | Huynh et al. |
| 7,898,187 B1 | 3/2011 | Mei et al. |
| 7,990,202 B2 | 8/2011 | Fang et al. |
| 8,013,544 B2 | 9/2011 | Negrete et al. |
| 8,093,826 B1 | 1/2012 | Eagar et al. |
| 8,144,487 B2 | 3/2012 | Djenguerian et al. |
| 8,391,028 B2 | 3/2013 | Yeh |
| 8,416,596 B2 | 4/2013 | Huang |
| 8,482,211 B2 | 7/2013 | Marent et al. |
| 8,525,442 B2 | 9/2013 | Zimmermann et al. |
| 8,593,075 B1 | 11/2013 | Melanson et al. |
| 8,630,103 B2 | 1/2014 | Bäurle et al. |
| 8,664,883 B2 | 3/2014 | Hiramatu et al. |
| 8,754,590 B2 * | 6/2014 | Makino ............... H02M 1/4208 315/307 |
| 8,824,173 B2 | 9/2014 | Fang et al. |
| 8,917,527 B2 | 12/2014 | Fang et al. |
| 9,084,317 B2 | 7/2015 | Fang et al. |
| 9,088,218 B2 | 7/2015 | Zhang et al. |
| 9,124,188 B2 | 9/2015 | Fang et al. |
| 9,148,061 B2 | 9/2015 | Fang et al. |
| 9,343,979 B2 | 5/2016 | Fang et al. |
| 9,531,278 B2 | 12/2016 | Zhang et al. |
| 9,794,997 B2 | 10/2017 | Fang et al. |
| 9,807,840 B2 | 10/2017 | Fang et al. |
| 9,812,970 B2 | 11/2017 | Fang et al. |
| 9,954,446 B2 | 4/2018 | Fang et al. |
| 9,986,605 B2 | 5/2018 | Fang |
| 10,003,271 B2 | 6/2018 | Fang et al. |
| 10,158,294 B2 | 12/2018 | Fang et al. |
| 10,205,395 B2 | 2/2019 | Zhang et al. |
| 10,277,132 B2 | 4/2019 | Zhang et al. |
| 10,314,130 B2 | 6/2019 | Fang et al. |
| 10,375,787 B2 | 8/2019 | Fang et al. |
| 10,548,195 B2 | 1/2020 | Fang et al. |
| 10,609,778 B2 | 3/2020 | Fang et al. |
| 10,667,351 B2 | 5/2020 | Fang et al. |
| 10,757,778 B2 | 8/2020 | Fang |
| 2002/0080625 A1 | 6/2002 | Goyhenetche et al. |
| 2003/0174520 A1 | 9/2003 | Bimbaud |
| 2006/0113975 A1 | 6/2006 | Mednik et al. |
| 2006/0244429 A1 | 11/2006 | Quitayen |
| 2007/0120506 A1 | 5/2007 | Grant |
| 2008/0067993 A1 | 3/2008 | Coleman |
| 2008/0191679 A1 | 8/2008 | Williams |
| 2009/0051336 A1 | 2/2009 | Hartlieb et al. |
| 2009/0051340 A1 | 2/2009 | Wang |
| 2009/0091953 A1 | 4/2009 | Huynh et al. |
| 2009/0189546 A1 * | 7/2009 | Chang Chien ......... H05B 45/14 315/307 |
| 2009/0261758 A1 | 10/2009 | Ger |
| 2009/0273292 A1 | 11/2009 | Zimmermann |
| 2009/0284178 A1 | 11/2009 | Jessenig et al. |
| 2009/0289618 A1 | 11/2009 | Tajima et al. |
| 2010/0019682 A1 | 1/2010 | Lu et al. |
| 2010/0020573 A1 | 1/2010 | Melanson |
| 2010/0128501 A1 | 5/2010 | Huang et al. |
| 2010/0141178 A1 * | 6/2010 | Negrete ............... H05B 45/10 315/307 |
| 2010/0238689 A1 | 9/2010 | Fei et al. |
| 2010/0308733 A1 | 12/2010 | Shao |
| 2010/0321956 A1 | 12/2010 | Yeh |
| 2011/0044076 A1 | 2/2011 | Zhang et al. |
| 2011/0096573 A1 | 4/2011 | Zhu et al. |
| 2011/0096574 A1 | 4/2011 | Huang |
| 2011/0148376 A1 | 6/2011 | Xu et al. |
| 2011/0254457 A1 | 10/2011 | Marent et al. |
| 2011/0267846 A1 | 11/2011 | Djenguerian et al. |
| 2011/0282704 A1 | 11/2011 | Graeber et al. |
| 2011/0285301 A1 * | 11/2011 | Kuang ............... H05B 45/37 315/200 R |
| 2011/0292704 A1 | 12/2011 | Makino et al. |
| 2011/0316511 A1 | 12/2011 | Wang et al. |
| 2012/0008344 A1 | 1/2012 | Zeng et al. |
| 2012/0043912 A1 | 2/2012 | Huynh et al. |
| 2012/0049758 A1 | 3/2012 | Hwang et al. |
| 2012/0049825 A1 | 3/2012 | Chen et al. |
| 2012/0075891 A1 | 3/2012 | Zhang et al. |
| 2012/0105030 A1 | 5/2012 | Chen et al. |
| 2012/0120342 A1 | 5/2012 | Uchimoto et al. |
| 2012/0146532 A1 | 6/2012 | Ivey et al. |
| 2012/0147630 A1 | 6/2012 | Cao et al. |
| 2012/0155122 A1 | 6/2012 | Tang et al. |
| 2012/0188670 A1 | 7/2012 | Lee et al. |
| 2012/0195076 A1 | 8/2012 | Zhang et al. |
| 2012/0217890 A1 | 8/2012 | Chang et al. |
| 2012/0281438 A1 | 11/2012 | Fang et al. |
| 2012/0320640 A1 | 12/2012 | Baurle et al. |
| 2013/0033905 A1 | 2/2013 | Lin et al. |
| 2013/0038227 A1 | 2/2013 | Yan et al. |
| 2013/0043849 A1 | 2/2013 | Pagano |
| 2013/0093356 A1 | 4/2013 | Green et al. |
| 2013/0114307 A1 | 5/2013 | Fang et al. |
| 2013/0119881 A1 | 5/2013 | Fang et al. |
| 2013/0147379 A1 | 6/2013 | Zhou et al. |
| 2013/0148387 A1 | 6/2013 | Ren et al. |
| 2013/0258723 A1 | 10/2013 | Fang et al. |
| 2013/0307431 A1 | 11/2013 | Zhu et al. |
| 2014/0029315 A1 | 1/2014 | Zhang et al. |
| 2014/0043879 A1 | 2/2014 | Eum et al. |
| 2014/0104895 A1 | 4/2014 | Baurle et al. |
| 2014/0140109 A1 | 5/2014 | Valley |
| 2014/0146578 A1 | 5/2014 | Fang et al. |
| 2014/0177280 A1 | 6/2014 | Yang et al. |
| 2015/0084530 A1 | 3/2015 | Kitamura et al. |
| 2015/0180347 A1 | 6/2015 | Fang et al. |
| 2015/0188441 A1 | 7/2015 | Fang et al. |
| 2015/0295494 A1 | 10/2015 | Gong |
| 2015/0311804 A1 | 10/2015 | Fang |
| 2015/0326130 A1 | 11/2015 | Zhang et al. |
| 2015/0334803 A1 | 11/2015 | Fang et al. |
| 2016/0028318 A1 | 1/2016 | Fang et al. |
| 2016/0276939 A1 | 9/2016 | Fang et al. |
| 2016/0278178 A1 | 9/2016 | Fang et al. |
| 2016/0285375 A1 | 9/2016 | Fang et al. |
| 2016/0329821 A1 | 11/2016 | Zhang et al. |
| 2017/0126137 A1 | 5/2017 | Zhang et al. |
| 2018/0042078 A1 | 2/2018 | Fang et al. |
| 2018/0042079 A1 | 2/2018 | Fang et al. |
| 2018/0076717 A1 | 3/2018 | Fang et al. |
| 2018/0124891 A1 | 5/2018 | Fang et al. |
| 2018/0310373 A1 | 10/2018 | Fang et al. |
| 2019/0191519 A1 | 6/2019 | Fang et al. |
| 2019/0327811 A1 | 10/2019 | Fang et al. |
| 2020/0221550 A1 | 7/2020 | Fang et al. |
| 2020/0260544 A1 | 8/2020 | Fang et al. |
| 2020/0367336 A1 | 11/2020 | Fang |

FOREIGN PATENT DOCUMENTS

| | | |
|---|---|---|
| CN | 101056063 A | 10/2007 |
| CN | 101164384 A | 4/2008 |
| CN | 201087939 Y | 7/2008 |
| CN | 101248574 A | 8/2008 |
| CN | 101777848 A | 7/2010 |

(56) References Cited

FOREIGN PATENT DOCUMENTS

| CN | 101835311 A | 9/2010 |
|---|---|---|
| CN | 1882214 B | 5/2011 |
| CN | 102055344 A | 5/2011 |
| CN | 102065602 A | 5/2011 |
| CN | 102076138 A | 5/2011 |
| CN | 102076149 A | 5/2011 |
| CN | 102083257 A | 6/2011 |
| CN | 102105010 A | 6/2011 |
| CN | 102158091 A | 8/2011 |
| CN | 102164439 A | 8/2011 |
| CN | 102185466 A | 9/2011 |
| CN | 102187736 A | 9/2011 |
| CN | 102202449 A | 9/2011 |
| CN | 102361402 A | 2/2012 |
| CN | 102437842 A | 5/2012 |
| CN | 102638165 A | 8/2012 |
| CN | 102651613 A | 8/2012 |
| CN | 102651935 A | 8/2012 |
| CN | 202435294 U | 9/2012 |
| CN | 103108437 | 5/2013 |
| CN | 103441660 A | 12/2013 |
| JP | 2011171231 | 9/2011 |
| TW | 185041 | 6/1992 |
| TW | 583817 | 4/2004 |
| TW | I 312914 | 8/2009 |
| TW | I 338994 | 3/2011 |
| TW | M412573 | 9/2011 |
| TW | 201134078 | 10/2011 |
| TW | I 357708 | 2/2012 |
| TW | 201218594 | 5/2012 |
| TW | 201249079 A | 12/2012 |
| TW | I 362170 | 12/2012 |
| TW | 201308842 A | 2/2013 |
| WO | WO 2007/041897 A1 | 4/2007 |

OTHER PUBLICATIONS

Chinese Patent Office, Office Action dated Apr. 3, 2014, in Application No. 201210258359.X.
Chinese Patent Office, Office Action dated May 14, 2014, in Application No. 201110123187.0.
Chinese Patent Office, Office Action dated Nov. 22, 2013, in Application No. 201110376439.0.
Chinese Patent Office, Office Action dated Apr. 15, 2015, in Application No. 201410053176.3.
Chinese Patent Office, Office Action dated Apr. 14, 2017, in Application No. 201510622975.2.
Chinese Patent Office, Office Action dated Oct. 10, 2017, in Application No. 201610177113.8.
Chinese Patent Office, Office Action dated Oct. 23, 2017, in Application No. 201610177276.6.
Chinese Patent Office, Office Action dated Dec. 25, 2017, in Application No. 201610177097.2.
Chinese Patent Office, Office Action dated Jul. 2, 2018, in Application No. 201610177276.6.
Liang et al., "Differential Detection Method of MOSFET Drain-source Voltage Valley Time," (Mar. 31, 2010).
Taiwanese Patent Office, Office Action dated Mar. 6, 2014, in Application No. 101102919.
Taiwanese Patent Office, Office Action dated Nov. 10, 2014, in Application No. 101118856.
Taiwanese Patent Office, Office Action dated Oct. 22, 2013, in Application No. 100120903.
Taiwanese Patent Office, Office Action dated Sep. 2, 2014, in Application No. 101144020.
Taiwanese Patent Office, Office Action dated Dec. 15, 2015, in Application No. 103140986.
United States Patent and Trademark Office, Office Action dated Apr. 12, 2019, in U.S. Appl. No. 15/958,208.
United States Patent and Trademark Office, Office Action dated Nov. 13, 2019, in U.S. Appl. No. 15/958,208.
United States Patent and Trademark Office, Notice of Allowance dated Apr. 22, 2020, in U.S. Appl. No. 15/958,208.
United States Patent and Trademark Office, Office Action dated Jun. 25, 2020, in U.S. Appl. No. 16/705,778.
United States Patent and Trademark Office, Notice of Allowance dated Dec. 1, 2020, in U.S. Appl. No. 16/705,778.
United States Patent and Trademark Office, Office Action dated May 17, 2021, in U.S. Appl. No. 16/793,012.

\* cited by examiner

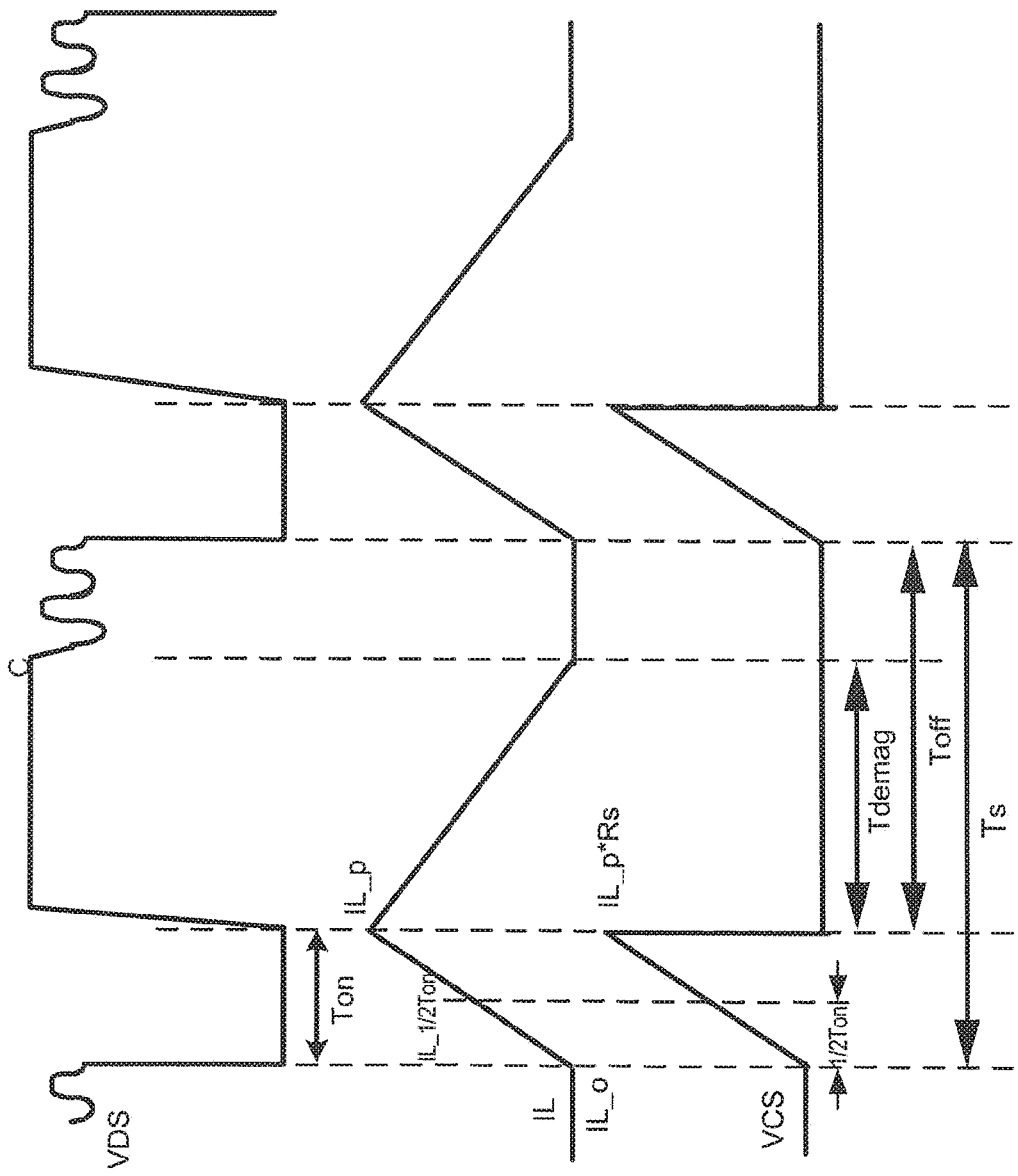

LED LIGHTING SYSTEMS AND METHODS FOR CONSTANT CURRENT CONTROL IN VARIOUS OPERATION MODES

1. CROSS-REFERENCES TO RELATED APPLICATIONS

This application is a divisional of U.S. patent application Ser. No. 16/222,032, filed Dec. 17, 2018, which is a divisional of U.S. patent application Ser. No. 15/812,933, filed Nov. 14, 2017, which is a continuation of U.S. patent application Ser. No. 15/683,402, filed Aug. 22, 2017, which is a continuation of U.S. patent application Ser. No. 15/055,366, filed Feb. 26, 2016, which is a continuation of U.S. patent application Ser. No. 14/728,815, filed Jun. 2, 2015, which is a divisional of U.S. patent application Ser. No. 13/331,860, filed Dec. 20, 2011, which claims priority to Chinese Patent Application No. 201110376439.0, filed Nov. 15, 2011, all of the above-referenced applications being incorporated by reference herein for all purposes.

2. BACKGROUND OF THE INVENTION

The present invention is directed to integrated circuits. More particularly, the invention provides lighting systems and methods for constant current control in various operation modes. Merely by way of example, the invention has been applied to one or more light emitting diodes. But it would be recognized that the invention has a much broader range of applicability.

Generally, a conventional lighting system for light emitting diodes (LEDs) often uses a floating Buck converter. This type of LED lighting system usually is cost effective with compact size. FIG. 1 is a simplified diagram showing a conventional LED lighting system with a Buck converter. The lighting system 100 includes a pulse-width-modulation (PWM) controller 110, a power switch 120, a diode 130, an inductor 140, capacitors 150 and 152, and a sensing resistor 160. Additionally, the lighting system 100 receives an input voltage and provides a lamp current and a lamp voltage to one or more LEDs 190.

As shown in FIG. 1, the power switch 120 includes terminals 122, 124, and 126. The PWM controller 110 outputs a drive signal 112 and receives a current sensing signal 114. The drive signal 112 corresponds to a switching period (e.g., $T_s$). For example, the power switch 120 is a MOS transistor. In another example, the power switch 120 is a bipolar transistor (e.g. an NPN bipolar transistor). In yet another example, the power switch 120 is an insulated gate bipolar transistor (IGBT).

It is highly desirable to improve the techniques of constant current control, so that a constant lamp current can be achieved in the DCM mode, the CCM mode and the critical conduction mode (CRM), and both high power factor and precision control can be realized.

3. BRIEF SUMMARY OF THE INVENTION

The present invention is directed to integrated circuits. More particularly, the invention provides lighting systems and methods for constant current control in various operation modes. Merely by way of example, the invention has been applied to one or more light emitting diodes. But it would be recognized that the invention has a much broader range of applicability.

According to another embodiment, a system for providing at least an output current to one or more light emitting diodes includes a control component configured to receive at least a demagnetization signal, a sensed signal and a reference signal and to generate a control signal based on at least information associated with the demagnetization signal, the sensed signal and the reference signal, and a logic and driving component configured to receive at least the control signal and output a drive signal to a switch based on at least information associated with the control signal. The switch is connected to a first diode terminal of a diode and a first inductor terminal of an inductor. The diode further includes a second diode terminal, and the inductor further includes a second inductor terminal. The second diode terminal and the second inductor terminal are configured to provide at least the output current to the one or more light emitting diodes. The control signal is configured to regulate the output current at a constant magnitude.

According to yet another embodiment, a method for providing at least an output current to one or more light emitting diodes includes receiving at least a demagnetization signal, a sensed signal and a reference signal, processing information associated with the demagnetization signal, the sensed signal and the reference signal, and generating a control signal based on at least information associated with the demagnetization signal, the sensed signal and the reference signal. Additionally, the method includes receiving at least the control signal, processing information associated with the control signal, and outputting a drive signal to a switch connected to a first diode terminal of a diode and a first inductor terminal of an inductor. The diode further includes a second diode terminal, and the inductor further includes a second inductor terminal. The second diode terminal and the second inductor terminal are configured to provide at least the output current to the one or more light emitting diodes. Moreover, the method includes regulating the output current at a predetermined magnitude based on at least information associated with the control signal.

According to yet another embodiment, a system for providing at least an output current to one or more light emitting diodes includes a first signal processing component configured to receive at least a sensed signal and generate a first signal. The sensed signal is associated with an inductor current flowing through an inductor coupled to a switch. Additionally, the system includes a second signal processing component configured to generate a second signal, an integrator component configured to receive the first signal and the second signal and generate a third signal, and a comparator configured to process information associated with the third signal and the sensed signal and generate a comparison signal based on at least information associated with the third signal and the sensed signal. Moreover, the system includes a signal generator configured to receive at least the comparison signal and generate a modulation signal, and a gate driver configured to receive the modulation signal and output a drive signal to the switch. The drive signal is associated with at least one or more switching periods, and each of the one or more switching periods includes at least an on-time period for the switch and a demagnetization period for a demagnetization process. For each of the one or more switching periods, the first signal represents a multiplication result of a first sum of the on-time period and the demagnetization period and a second sum of a first current magnitude and a second current magnitude, and the second signal represents the switching period multiplied by a predetermined current magnitude. The first current magnitude represents the inductor current at the beginning of the on-time period, and the second current magnitude represents the inductor current at the end of the on-time period. The integrator component is further configured to integrate period-by-period differences between the first signal and the second signal for a plurality of switching periods, and the third signal represents the integrated period-by-period differences. The integrated period-by-period differences are smaller than a predetermined threshold in magnitude.

According to yet another embodiment, a method for providing at least an output current to one or more light emitting diodes includes receiving at least a sensed signal. The sensed signal is associated with an inductor current flowing through an inductor coupled to a switch. Additionally, the method includes processing information associated with the sensed signal, generating a first signal based on at least information associated with the sensed signal, generating a second signal, receiving the first signal and the second signal, processing information associated with the first signal and the second signal, and generating a third signal based on at least information associated with the first signal and the second signal. Moreover, the method includes processing information associated with the third signal and the sensed signal, generating a comparison signal based on at least information associated with the third signal and the sensed signal, receiving at least the comparison signal, generating a modulation signal based on at least information associated with the comparison signal, receiving the modulation signal, and outputting a drive signal based on at least information associated with the modulation signal. The drive signal is associated with at least one or more switching periods, and each of the one or more switching periods includes at least an on-time period and a demagnetization period. For each of the one or more switching periods, the first signal represents a multiplication result of a first sum of the on-time period and the demagnetization period and a second sum of a first current magnitude and a second current magnitude, and the second signal represents the switching period multiplied by a predetermined current magnitude. The first current magnitude represents the inductor current at the beginning of the on-time period, and the second current magnitude represents the inductor current at the end of the on-time period. The process for processing information associated with the first signal and the second signal includes integrating period-by-period differences between the first signal and the second signal for a plurality of switching periods, and the third signal represents the integrated period-by-period differences. The integrated period-by-period differences are smaller than a predetermined threshold in magnitude.

According to yet another embodiment, a system for providing at least an output current to one or more light emitting diodes includes a first signal processing component configured to receive at least a sensed signal and generate a first signal. The sensed signal is associated with an inductor current flowing through an inductor coupled to a switch. Additionally, the system includes a second signal processing component configured to generate a second signal, an integrator component configured to receive the first signal and the second signal and generate a third signal, and a comparator configured to process information associated with the third signal and the sensed signal and generate a comparison signal based on at least information associated with the third signal and the sensed signal. Moreover, the system includes a signal generator configured to receive at least the comparison signal and generate a modulation signal, and a gate driver configured to receive the modulation signal and output a drive signal to the switch. The drive signal is associated with at least one or more switching periods, and each of the one or more switching periods includes at least an on-time period for the switch and a demagnetization period for a demagnetization process. For each of the one or more switching periods, the first signal represents a sum of a first multiplication result and a second multiplication result, and the second signal represents the switching period multiplied by a predetermined current magnitude. The first multiplication result is equal to the on-time period multiplied by a sum of a first current magnitude and a second current magnitude. The first current magnitude represents the inductor current at the beginning of the on-time period, and the second current magnitude represents the inductor current at the end of the on-time period. The second multiplication result is equal to two multiplied by the demagnetization period and further multiplied by a third current magnitude, and the third current magnitude represents the inductor current at the middle of the on-time period. The integrator component is further configured to integrate period-by-period differences between the first signal and the second signal for a plurality of switching periods, and the third signal represents the integrated period-by-period differences. The integrated period-by-period differences are smaller than a predetermined threshold in magnitude.

According to yet another embodiment, a method for providing at least an output current to one or more light emitting diodes includes receiving at least a sensed signal. The sensed signal is associated with an inductor current flowing through an inductor coupled to a switch. Additionally, the method includes processing information associated with the sensed signal, generating a first signal based on at least information associated with the sensed signal, generating a second signal, receiving the first signal and the second signal, processing information associated with the first signal and the second signal, and generating a third signal based on at least information associated with the first signal and the second signal. Moreover, the method includes processing information associated with the third signal and the sensed signal, generating a comparison signal based on at least information associated with the third signal and the sensed signal, receiving at least the comparison signal, and generating a modulation signal based on at least information associated with the comparison signal. Also, the method includes receiving the modulation signal, and outputting a drive signal based on at least information associated with the modulation signal. The drive signal is associated with at least one or more switching periods, and each of the one or more switching periods includes at least an on-time period and a demagnetization period. For each of the one or more switching periods, the first signal represents a sum of a first multiplication result and a second multiplication result, and the second signal represents the switching period multiplied by a predetermined current magnitude. The first multiplication result is equal to the on-time period multiplied by a sum of a first current magnitude and a second current magnitude. The first current magnitude represents the inductor current at the beginning of the on-time period, and the second current magnitude represents the inductor current at the end of the on-time period. The second multiplication result is equal to two multiplied by the demagnetization period and further multiplied by a third current magnitude, and the third current magnitude represents the inductor current at the middle of the on-time period. The process for processing information associated with the first signal and the second signal includes integrating period-by-period differences between the first signal and the second signal for a plurality of switching periods, and the third signal represents the integrated period-by-period differences. The integrated period-by-period differences are smaller than a predetermined threshold in magnitude.

According to yet another embodiment, a system for providing at least an output current to one or more light emitting diodes includes a first sampling-and-holding and voltage-to-current-conversion component configured to receive at least a sensed signal and generate a first current signal. The sensed signal is associated with an inductor current flowing through an inductor coupled to a first switch. Additionally, the system includes a second sampling-and-holding and voltage-to-current-conversion component configured to receive at least the sensed signal and generate a second current signal, and a signal-amplification and voltage-to-current-conversion component configured to receive at least the sensed signal and generate a third current signal. Moreover, the system includes a current-signal generator configured to generate a fourth current signal, and a capacitor coupled to the current-signal generator, coupled through a second switch to the first sampling-and-holding and voltage-to-current-conversion component and the second sampling-and-holding and voltage-to-current-conversion component, and coupled through a third switch to the signal-amplification and voltage-to-current-conversion component. The capacitor is configured to generate a voltage signal. Also, the system includes a comparator configured to process information associated with the voltage signal and the sensed signal and generate a comparison signal based on at least information associated with the voltage signal and the sensed signal. Additionally, the system includes a modulation-signal generator configured to receive at least the comparison signal and generate a modulation signal, and a gate driver configured to receive the modulation signal and output a drive signal to the first switch. The drive signal is associated with at least one or more switching periods, and each of the one or more switching periods includes at least an on-time period for the first switch and a demagnetization period for a demagnetization process. The first current signal represents the inductor current at the beginning of the on-time period, the second current signal represents the inductor current at the end of the on-time period, and the third current signal represents the inductor current. For each of the one or more switching periods, the first current signal and the second current signal are configured to discharge or charge the capacitor during only the demagnetization period, the third current signal is configured to discharge or charge the capacitor during only the on-time period, and the fourth current signal is configured to charge or discharge the capacitor during the switching period.

According to yet another embodiment, a method for providing at least an output current to one or more light emitting diodes includes receiving at least a sensed signal. The sensed signal is associated with an inductor current flowing through an inductor coupled to a switch, processing information associated with the sensed signal, and generating a first current signal, a second current signal, and a third current signal based on at least information associated with the sensed signal. Additionally, the method includes generating a fourth current signal, processing information associated with the first current signal, the second current signal, the third current signal, and the fourth current signal, and generating a voltage signal, by at least a capacitor, based on at least information associated with the first current signal, the second current signal, the third current signal, and the fourth current signal. Moreover, the method includes processing information associated with the voltage signal and the sensed signal, generating a comparison signal based on at least information associated with the voltage signal and the sensed signal, receiving at least the comparison signal, and generating a modulation signal based on at least information associated with the comparison signal. Also, the method includes receiving the modulation signal, and outputting a drive signal based on at least information associated with the modulation signal. The drive signal is associated with at least one or more switching periods, and each of the one or more switching periods includes at least an on-time period and a demagnetization period. The first current signal represents the inductor current at the beginning of the on-time period, the second current signal represents the inductor current at the end of the on-time period, and the third current signal represents the inductor current. For each of the one or more switching periods, the process for processing information associated with the first current signal, the second current signal, the third current signal, and the fourth current signal includes discharging or charging the capacitor with the first current signal and the second current signal during only the demagnetization period, discharging or charging the capacitor with the third current signal during only the on-time period, and charging or discharging the capacitor with the fourth current signal during the switching period.

According to yet another embodiment, a system for providing at least an output current to one or more light emitting diodes includes a signal-amplification and voltage-to-current-conversion component configured to receive at least a sensed signal and generate a first current signal. The sensed signal is associated with an inductor current flowing through an inductor coupled to a first switch. Additionally, the system includes a current-signal generator configured to generate a second current signal, and a capacitor coupled to the current-signal generator, and coupled through a second switch to the signal-amplification and voltage-to-current-conversion component. The capacitor is configured to generate a voltage signal. Moreover, the system includes a comparator configured to process information associated with the voltage signal and the sensed signal and generate a comparison signal based on at least information associated with the voltage signal and the sensed signal, a modulation-signal generator configured to receive at least the comparison signal and generate a modulation signal, and a gate driver configured to receive the modulation signal and output a drive signal to the first switch. The drive signal is associated with at least one or more switching periods, and the first current signal represents the inductor current. Each of the one or more switching periods includes at least an on-time period for the first switch. For each of the one or more switching periods, the first current signal is configured to discharge or charge the capacitor during only the on-time period, and the second current signal is configured to charge or discharge the capacitor during only the on-time period.

According to yet another embodiment, a method for providing at least an output current to one or more light emitting diodes includes receiving at least a sensed signal. The sensed signal is associated with an inductor current flowing through an inductor coupled to a switch. Additionally, the method includes processing information associated with the sensed signal, generating a first current signal based on at least information associated with the sensed signal, generating a second current signal, processing information associated with the first current signal and the second current signal, and generating a voltage signal, by at least a capacitor, based on at least information associated with the first current signal and the second current signal. Moreover, the method includes processing information associated with the voltage signal and the sensed signal, generating a comparison signal based on at least information associated with the voltage signal and the sensed signal, receiving at least the comparison signal, generating a modulation signal based on at least information associated with the comparison signal, receiving the modulation signal, and outputting a drive signal based on at least information associated with the modulation signal. The drive signal is associated with at least one or more switching periods, and the first current signal represents the inductor current. Each of the one or more switching periods includes at least an on-time period. For each of the one or more switching periods, the process for processing information associated with the first current signal and the second current signal includes discharging or charging the capacitor with the first current signal during only the on-time period, and charging or discharging the capacitor with the second current signal during only the on-time period.

According to yet another embodiment, a system for providing at least an output current to one or more light emitting diodes includes a transconductance amplifier configured to receive a sensed signal and also receive a predetermined voltage signal through a first switch. The sensed signal is associated with an inductor current flowing through an inductor coupled to a second switch, and the transconductance amplifier is further configured to generate a current signal. Additionally, the system includes a capacitor coupled to the transconductance amplifier and configured to generate a voltage signal, and a comparator configured to process information associated with the voltage signal and the sensed signal and generate a comparison signal based on at least information associated with the voltage signal and the sensed signal. Moreover, the system includes a modulation-signal generator configured to receive at least the comparison signal and generate a modulation signal, and a gate driver configured to receive the modulation signal and output a drive signal to the second switch. The drive signal is associated with at least one or more switching periods, and each of the one or more switching periods includes at least an on-time period for the second switch. The transconductance amplifier is further configured to, for each of the one or more switching periods, receive at least a predetermined voltage signal only during the on-time period. The current signal is configured to charge or discharge the capacitor.

According to yet another embodiment, a method for providing at least an output current to one or more light emitting diodes includes receiving at least a sensed signal. The sensed signal is associated with an inductor current flowing through an inductor coupled to a switch. Additionally, the method includes processing information associated with the sensed signal and a predetermined voltage signal, generating a current signal based on at least information associated with the sensed signal and the predetermined voltage signal, and processing information associated with the current signal. Moreover, the method includes generating a voltage signal, by at least a capacitor, based on at least information associated with the current signal, processing information associated with the voltage signal and the sensed signal, and generating a comparison signal based on at least information associated with the voltage signal and the sensed signal. Also, the method includes receiving at least the comparison signal, generating a modulation signal based on at least information associated with the comparison signal, receiving the modulation signal, and outputting a drive signal based on at least information associated with the modulation signal. The drive signal is associated with at least one or more switching periods, and each of the one or more switching periods includes at least an on-time period. The process for receiving at least a sensed signal includes, for each of the one or more switching periods, receiving at least the predetermined voltage signal during only the on-time period. Also, the process for processing information associated with the current signal includes charging or discharging the capacitor with the current signal.

According to yet another embodiment, a system for providing at least an output current to one or more light emitting diodes includes a first sampling-and-holding and voltage-to-current-conversion component configured to receive at least a sensed signal and generate a first current signal. The sensed signal is associated with an inductor current flowing through an inductor coupled to a first switch. Additionally, the system includes a second sampling-and-holding and voltage-to-current-conversion component configured to receive at least the sensed signal and generate a second current signal, and a signal-amplification and voltage-to-current-conversion component configured to receive at least the sensed signal and generate a third current signal, a current-signal generator configured to generate a fourth current signal, and a capacitor coupled to the current-signal generator, coupled through a second switch to the first sampling-and-holding and voltage-to-current-conversion component and the second sampling-and-holding and voltage-to-current-conversion component, and coupled through a third switch to the signal-amplification and voltage-to-current-conversion component, the capacitor being configured to generate a first voltage signal. Moreover, the system includes a multiplier component configured to process information associated with the first voltage signal and a second voltage signal and generate a multiplication signal based on at least information associated with the first voltage signal and the second voltage signal. Also, the system includes a comparator configured to receive the multiplication signal and the sensed signal and generate a comparison signal based on at least information associated with the multiplication signal and the sensed signal, a modulation-signal generator configured to receive at least the comparison signal and generate a modulation signal, and a gate driver configured to receive the modulation signal and output a drive signal to the first switch. The drive signal is associated with at least a plurality of switching periods, and each of the one or more switching periods includes at least an on-time period for the first switch and a demagnetization period for a demagnetization process. The first current signal represents the inductor current at the beginning of the on-time period, the second current signal represents the inductor current at the end of the on-time period, and the third current signal represents the inductor current. For the plurality of switching periods, the first current signal and the second current signal are configured to discharge or charge the capacitor during only the demagnetization period, the third current signal is configured to discharge or charge the capacitor during only the on-time period, and the fourth current signal is configured to charge or discharge the capacitor during the switching period.

According to yet another embodiment, a method for providing at least an output current to one or more light emitting diodes includes receiving at least a sensed signal. The sensed signal is associated with an inductor current flowing through an inductor coupled to a switch. Additionally, the method includes processing information associated with the sensed signal, and generating a first current signal, a second current signal, and a third current signal based on at least information associated with the sensed signal. Moreover, the method includes generating a fourth current signal, processing information associated with the first current signal, the second current signal, the third current signal, and the fourth current signal, and generating a first voltage signal, by at least a capacitor, based on at least information associated with the first current signal, the second current signal, the third current signal, and the fourth current signal. Also, the method includes processing information associated with the first voltage signal and a second voltage signal, generating a multiplication signal based on at least information associated with the first voltage signal and the second voltage signal, receiving the multiplication signal and the sensed signal, and generating a comparison signal based on at least information associated with the multiplication signal and the sensed signal. Additionally, the method includes receiving at least the comparison signal, generating a modulation signal based on at least information associated with the comparison signal, receiving the modulation signal, and outputting a drive signal based on at least information associated with the modulation signal. The drive signal is associated with at least a plurality of switching periods, and each of the plurality of switching periods includes at least an on-time period and a demagnetization period. The first current signal represents the inductor current at the beginning of the on-time period, the second current signal represents the inductor current at the end of the on-time period, and the third current signal represents the inductor current. For each of the plurality of switching periods, the process for processing information associated with the first current signal, the second current signal, the third current signal, and the fourth current signal includes discharging or charging the capacitor with the first current signal and the second current signal during only the demagnetization period, discharging or charging the capacitor with the third current signal during only the on-time period, and charging or discharging the capacitor with the fourth current signal during the switching period.

According to yet another embodiment, a system for providing at least an output current to one or more light emitting diodes includes a transconductance amplifier configured to receive a sensed signal and also receive a predetermined voltage signal through a first switch. The sensed signal is associated with an inductor current flowing through an inductor coupled to a second switch, and the transconductance amplifier is further configured to generate a current signal. Additionally, the system includes a capacitor coupled to the transconductance amplifier and configured to generate a voltage signal, and a comparator configured to process information associated with the voltage signal and a ramping signal and generate a comparison signal based on at least information associated with the voltage signal and the ramping signal. Moreover, the system includes a modulation-signal generator configured to receive at least the comparison signal and generate a modulation signal, and a gate driver configured to receive the modulation signal and output a drive signal to the second switch. The drive signal is associated with at least one or more switching periods, each of the one or more switching periods including at least an on-time period for the second switch. The transconductance amplifier is further configured to, for each of the one or more switching periods, receive at least a predetermined voltage signal only during the on-time period. The current signal is configured to charge or discharge the capacitor.

According to yet another embodiment, a method for providing at least an output current to one or more light emitting diodes includes receiving at least a sensed signal. The sensed signal is associated with an inductor current flowing through an inductor coupled to a switch. Additionally, the method includes processing information associated with the sensed signal and a predetermined voltage signal, generating a current signal based on at least information associated with the sensed signal and the predetermined voltage signal, processing information associated with the current signal, and generating a voltage signal, by at least a capacitor, based on at least information associated with the current signal. Moreover, the method includes processing information associated with the voltage signal and a ramping signal, generating a comparison signal based on at least information associated with the voltage signal and the ramping signal, receiving at least the comparison signal, and generating a modulation signal based on at least information associated with the comparison signal. Also, the method includes receiving the modulation signal and outputting a drive signal based on at least information associated with the modulation signal. The drive signal is associated with at least one or more switching periods, and each of the one or more switching periods includes at least an on-time period. The process for receiving at least a sensed signal includes, for each of the one or more switching periods, receiving at least a predetermined voltage signal only during the on-time period, and the process for processing information associated with the current signal includes charging or discharging the capacitor with the current signal.

According to yet another embodiment, a system for providing at least an output current to one or more light emitting diodes includes a transconductance amplifier configured to receive a sensed signal and also receive a predetermined voltage signal through a first switch. The sensed signal is associated with an inductor current flowing through an inductor coupled to a second switch, and the transconductance amplifier is further configured to generate a current signal. Additionally, the system includes a capacitor coupled to the transconductance amplifier and configured to generate a first voltage signal, and a multiplier component configured to process information associated with the first voltage signal and a second voltage signal and generate a multiplication signal based on at least information associated with the first voltage signal and the second voltage signal. Moreover, the system includes a comparator configured to receive the multiplication signal and the sensed signal and generate a comparison signal based on at least information associated with the multiplication signal and the sensed signal, a modulation-signal generator configured to receive at least the comparison signal and generate a modulation signal, and a gate driver configured to receive the modulation signal and output a drive signal to the second switch. The drive signal is associated with at least one or more switching periods, each of the one or more switching periods including at least an on-time period for the second switch. The transconductance amplifier is further configured to, for each of the one or more switching periods, receive at least a predetermined voltage signal during only the on-time period. The current signal is configured to charge or discharge the capacitor.

According to yet another embodiment, a method for providing at least an output current to one or more light emitting diodes includes receiving at least a sensed signal. The sensed signal is associated with an inductor current flowing through an inductor coupled to a switch. Additionally, the method includes processing information associated with the sensed signal and a predetermined voltage signal, generating a current signal based on at least information associated with the sensed signal and the predetermined voltage signal, processing information associated with the current signal, and generating a first voltage signal, by at least a capacitor, based on at least information associated with the current signal. Moreover, the method includes processing information associated with the first voltage signal and a second voltage signal, generating a multiplication signal based on at least information associated with the first voltage signal and the second voltage signal, receiving the multiplication signal and the sensed signal, and generating a comparison signal based on at least information associated with the multiplication signal and the sensed signal. Also, the method includes receiving at least the comparison signal, generating a modulation signal based on at least information associated with the comparison signal, receiving the modulation signal, and outputting a drive signal based on at least information associated with the modulation signal. The drive signal is associated with at least one or more switching periods, and each of the one or more switching periods includes at least an on-time period. The process for receiving at least a sensed signal includes, for each of the one or more switching periods, receiving at least a predetermined voltage signal during only the on-time period, and the process for processing information associated with the current signal includes charging or discharging the capacitor with the current signal.

According to yet another embodiment, a system for providing at least an output current to one or more light emitting diodes includes a first signal processing component configured to receive at least a sensed signal and generate a first signal. The sensed signal is associated with an inductor current flowing through an inductor coupled to a switch. Additionally, the system includes a second signal processing component configured to generate a second signal, an integrator component configured to receive the first signal and the second signal and generate a third signal, a comparator configured to process information associated with the third signal and the sensed signal and generate a comparison signal based on at least information associated with the third signal and the sensed signal. Moreover, the system includes a signal generator configured to receive at least the comparison signal and generate a modulation signal, and a gate driver configured to receive the modulation signal and output a drive signal to the switch. The drive signal is associated with at least one or more switching periods, and each of the one or more switching periods includes at least an on-time period for the switch and a demagnetization period for a demagnetization process. The first signal processing component is further configured to, for each of the one or more switching periods, sample the sensed signal at the middle of the on-time period, hold the sampled sensed signal representing the inductor current at the middle of the on-time period, and generate the first signal representing a sum of a first multiplication result and a second multiplication result based on at least information associated with the held and sampled sensed signal. For each of the one or more switching periods, the second signal represents the switching period multiplied by a predetermined current magnitude. The integrator component is further configured to integrate period-by-period differences between the first signal and the second signal for a plurality of switching periods, and the third signal represents the integrated period-by-period differences. The integrated period-by-period differences are smaller than a predetermined threshold in magnitude.

According to yet another embodiment, a method for providing at least an output current to one or more light emitting diodes includes receiving at least a sensed signal. The sensed signal is associated with an inductor current flowing through an inductor coupled to a switch. Additionally, the method includes processing information associated with the sensed signal, generating a first signal based on at least information associated with the sensed signal, generating a second signal, receiving the first signal and the second signal, processing information associated with the first signal and the second signal, and generating a third signal based on at least information associated with the first signal and the second signal. Moreover, the method includes processing information associated with the third signal and the sensed signal, generating a comparison signal based on at least information associated with the third signal and the sensed signal, receiving at least the comparison signal, and generating a modulation signal based on at least information associated with the comparison signal. Also, the method includes receiving the modulation signal, and outputting a drive signal based on at least information associated with the modulation signal. The drive signal is associated with at least one or more switching periods, and each of the one or more switching periods includes at least an on-time period for the switch and a demagnetization period for a demagnetization process. The process for processing information associated with the sensed signal includes, for each of the one or more switching periods, sampling the sensed signal at the middle of the on-time period, and holding the sampled sensed signal representing the inductor current at the middle of the on-time period. For each of the one or more switching periods, the first signal represents a sum of a first multiplication result and a second multiplication result generated based on at least information associated with the held and sampled sensed signal, and the second signal represents the switching period multiplied by a predetermined current magnitude. The process for processing information associated with the first signal and the second signal includes integrating period-by-period differences between the first signal and the second signal for a plurality of switching periods, and the third signal represents the integrated period-by-period differences. The integrated period-by-period differences are smaller than a predetermined threshold in magnitude.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 4:
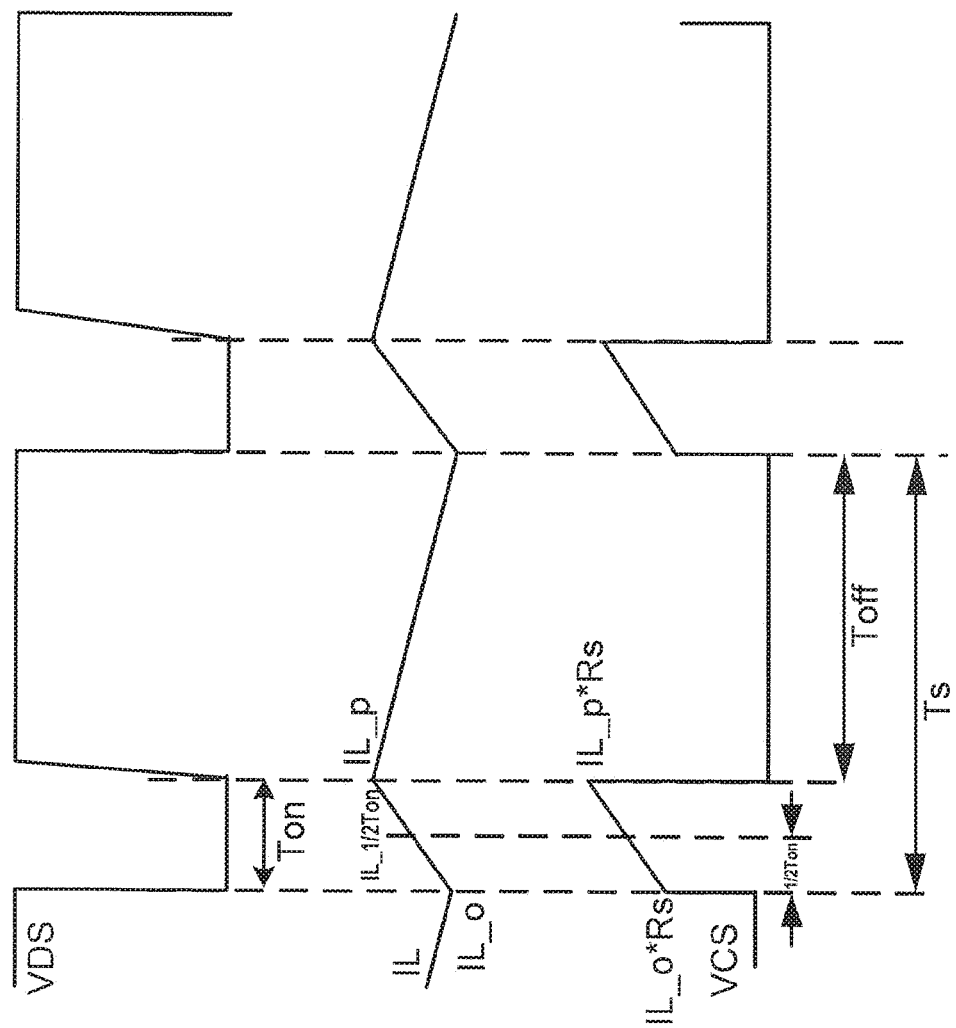
Figure 4:
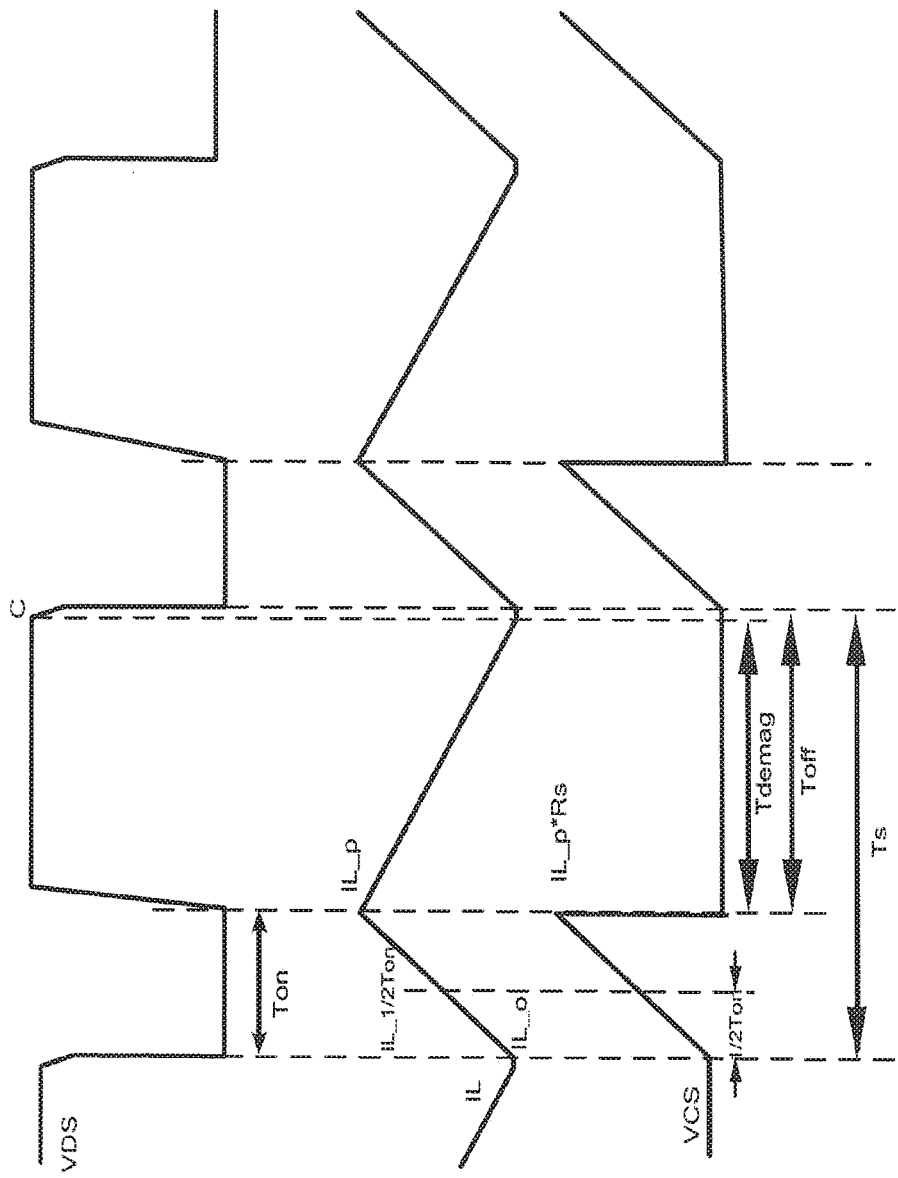

FIGS. 4(A), (B), and (C) are simplified diagrams showing timing diagrams for the lighting system 300 that operates in the discontinuous conduction mode (DCM), the continuous conduction mode (CCM), and the critical conduction mode (CRM), respectively.

Figure 5:
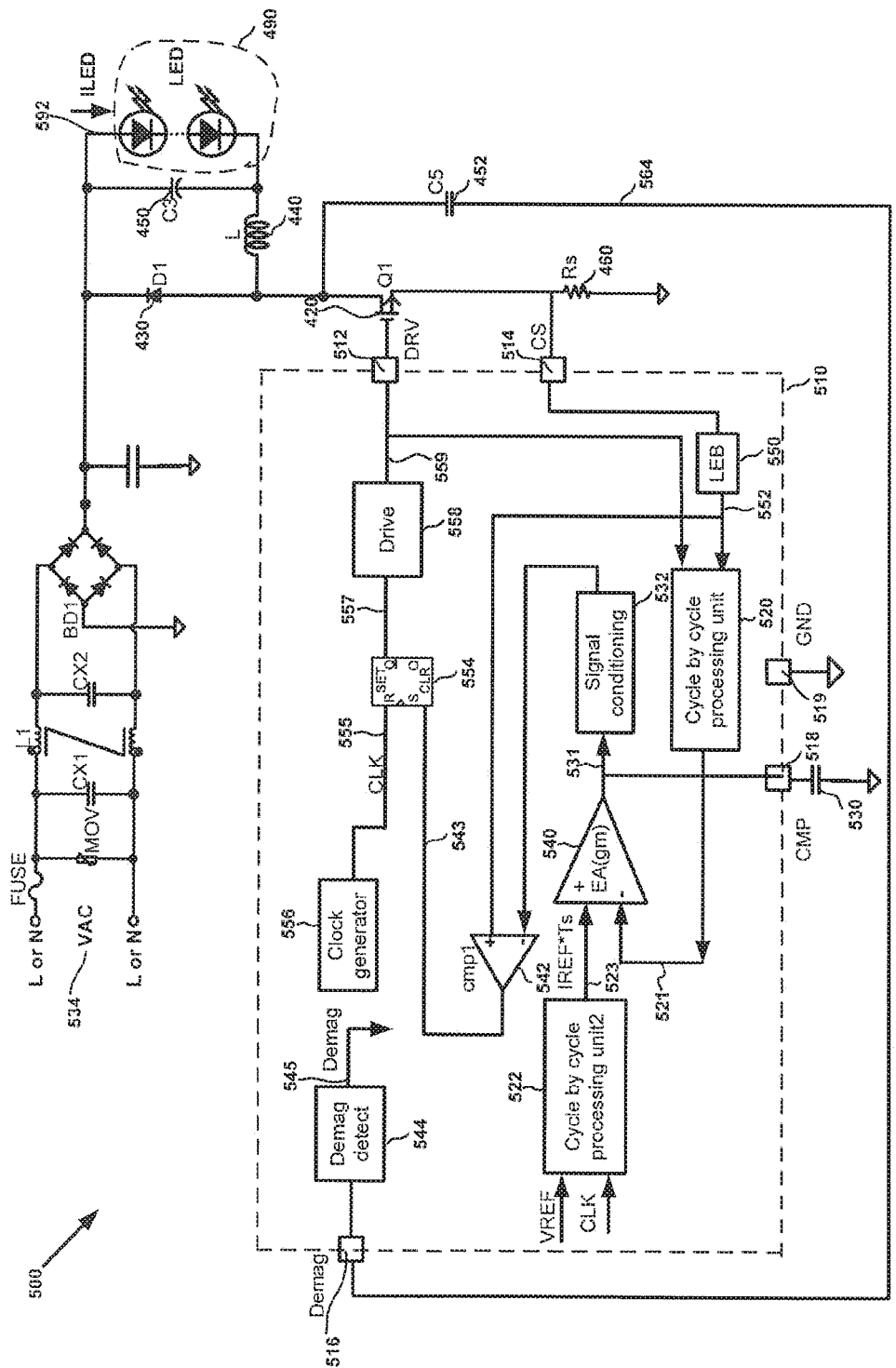

FIG. 5 is a simplified diagram for a LED lighting system according to another embodiment of the present invention.

Figure 6:
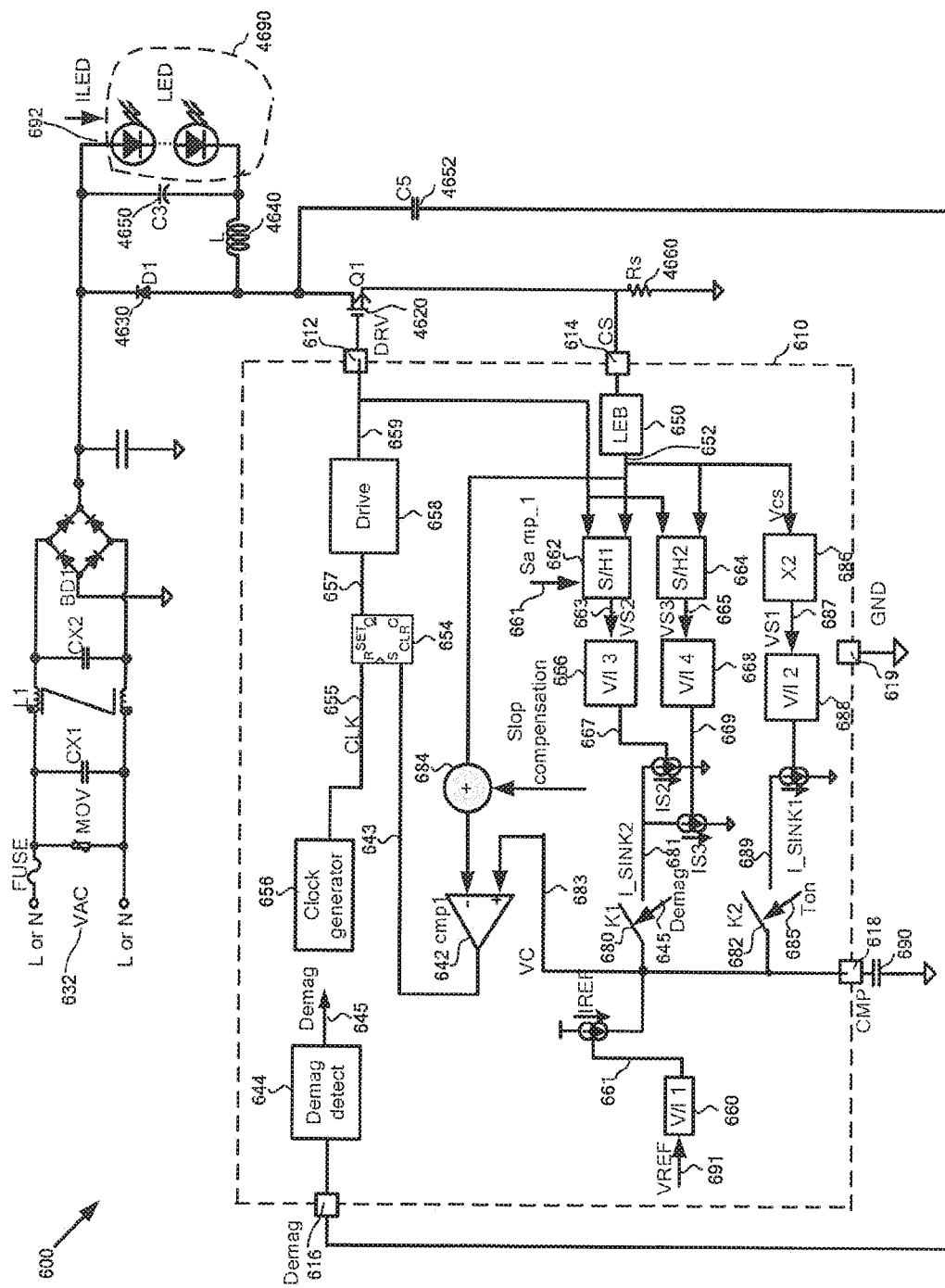

FIG. 6 is a simplified diagram for a LED lighting system according to yet another embodiment of the present invention.

Figure 7:
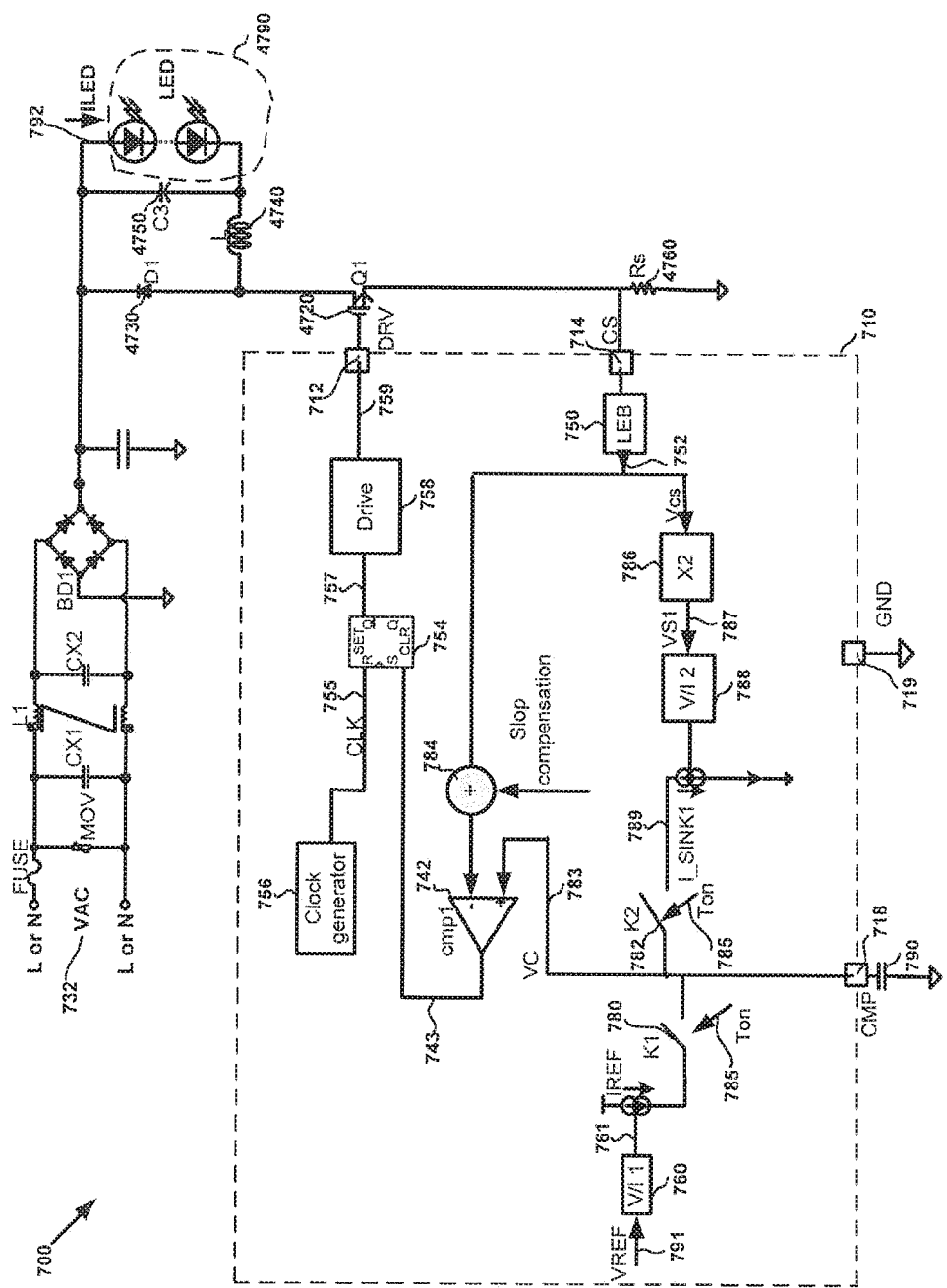

FIG. 7 is a simplified diagram for a LED lighting system according to yet another embodiment of the present invention.

Figure 8:
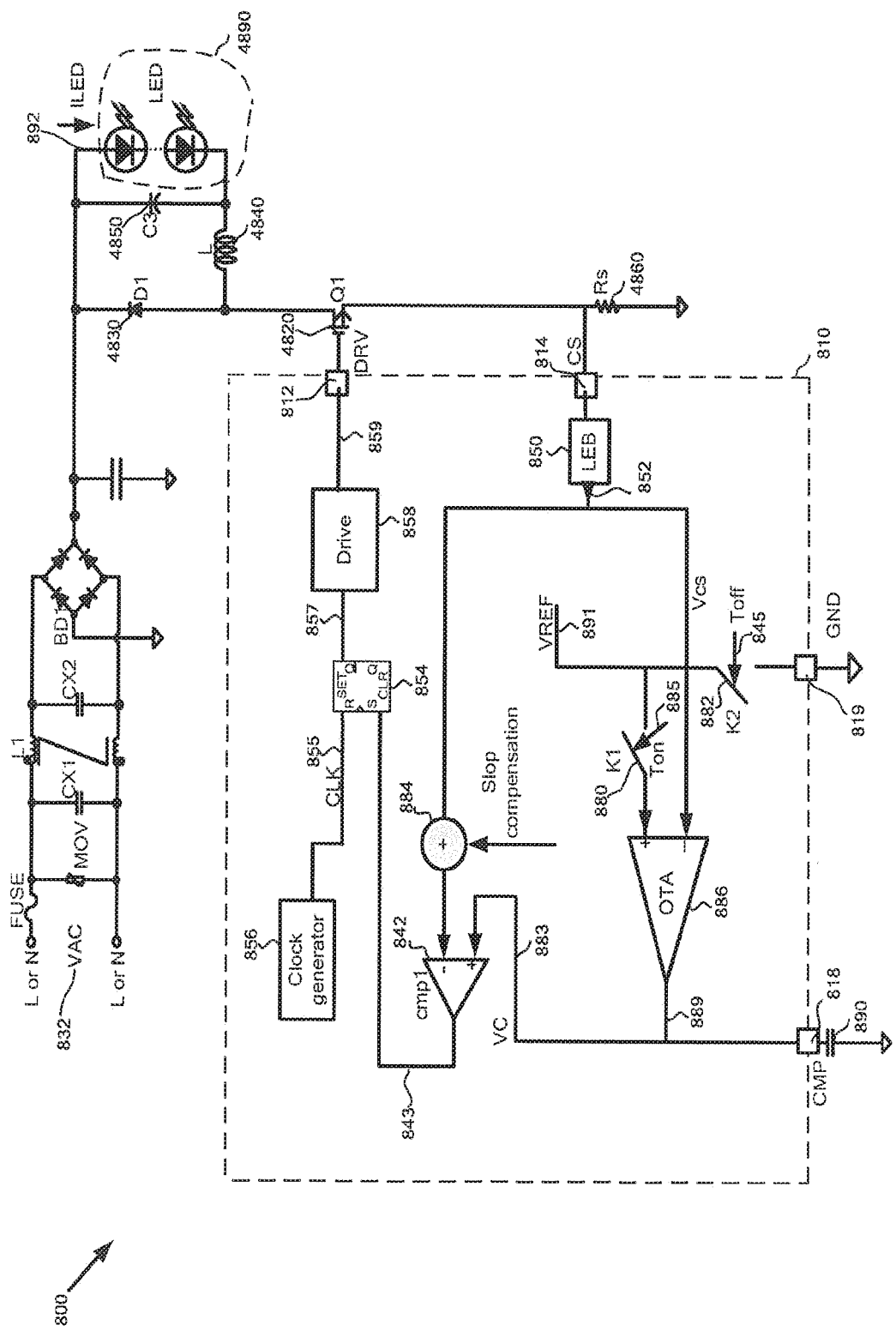

FIG. 8 is a simplified diagram for a LED lighting system according to yet another embodiment of the present invention.

Figure 9:
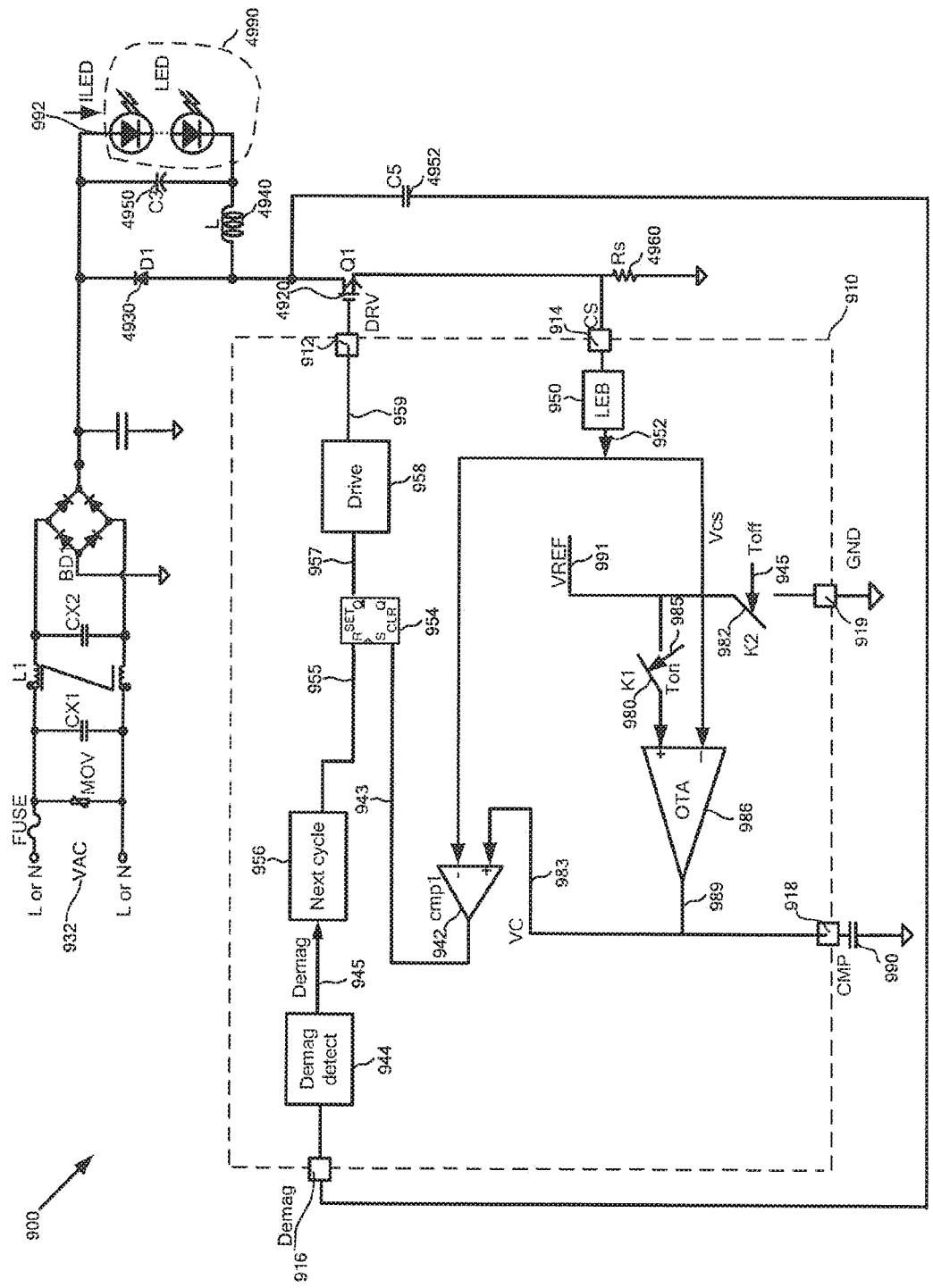

FIG. 9 is a simplified diagram for a LED lighting system according to yet another embodiment of the present invention.

Figure 10:
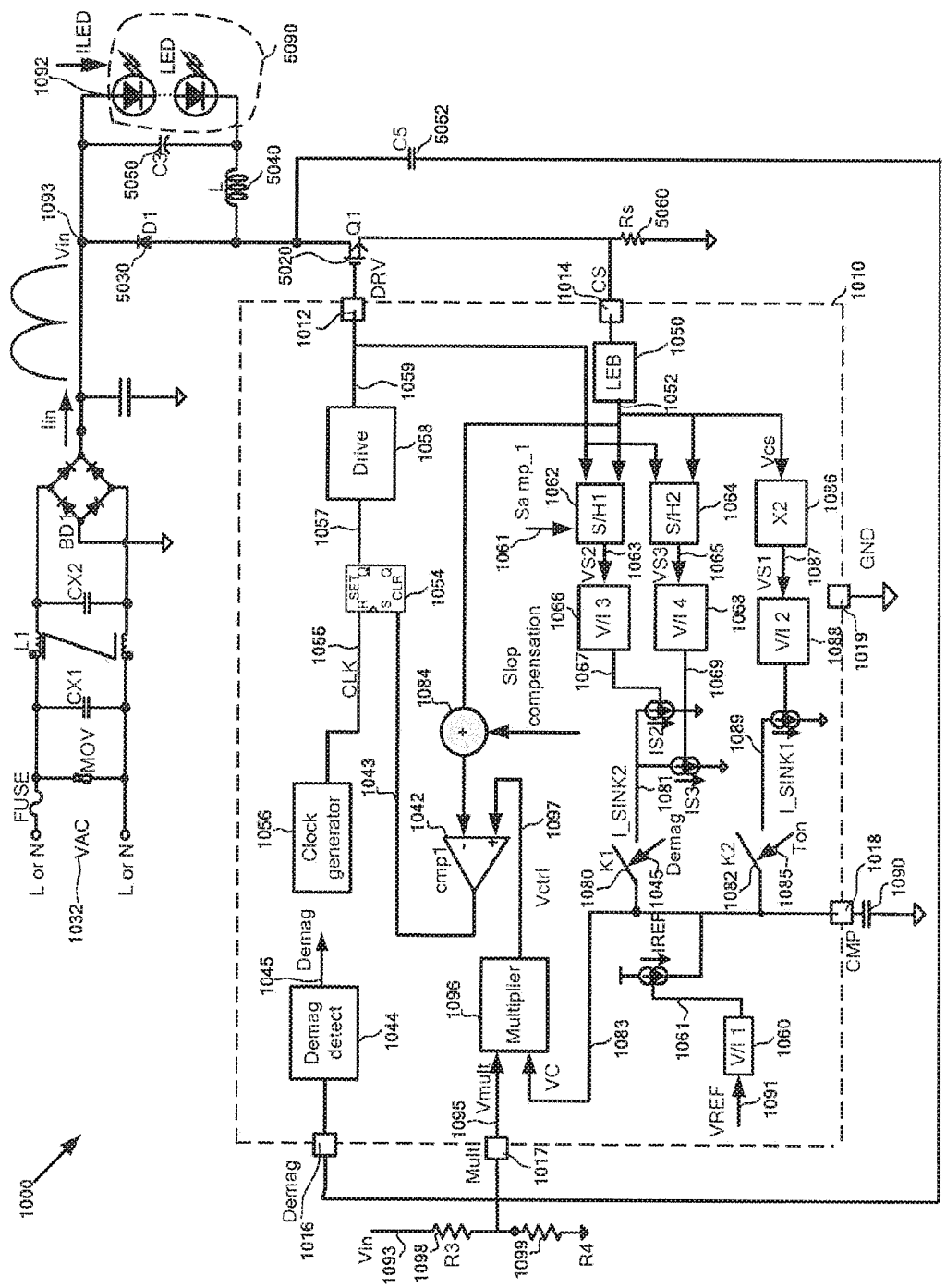

FIG. 10 is a simplified diagram for a LED lighting system according to yet another embodiment of the present invention.

Figure 11:
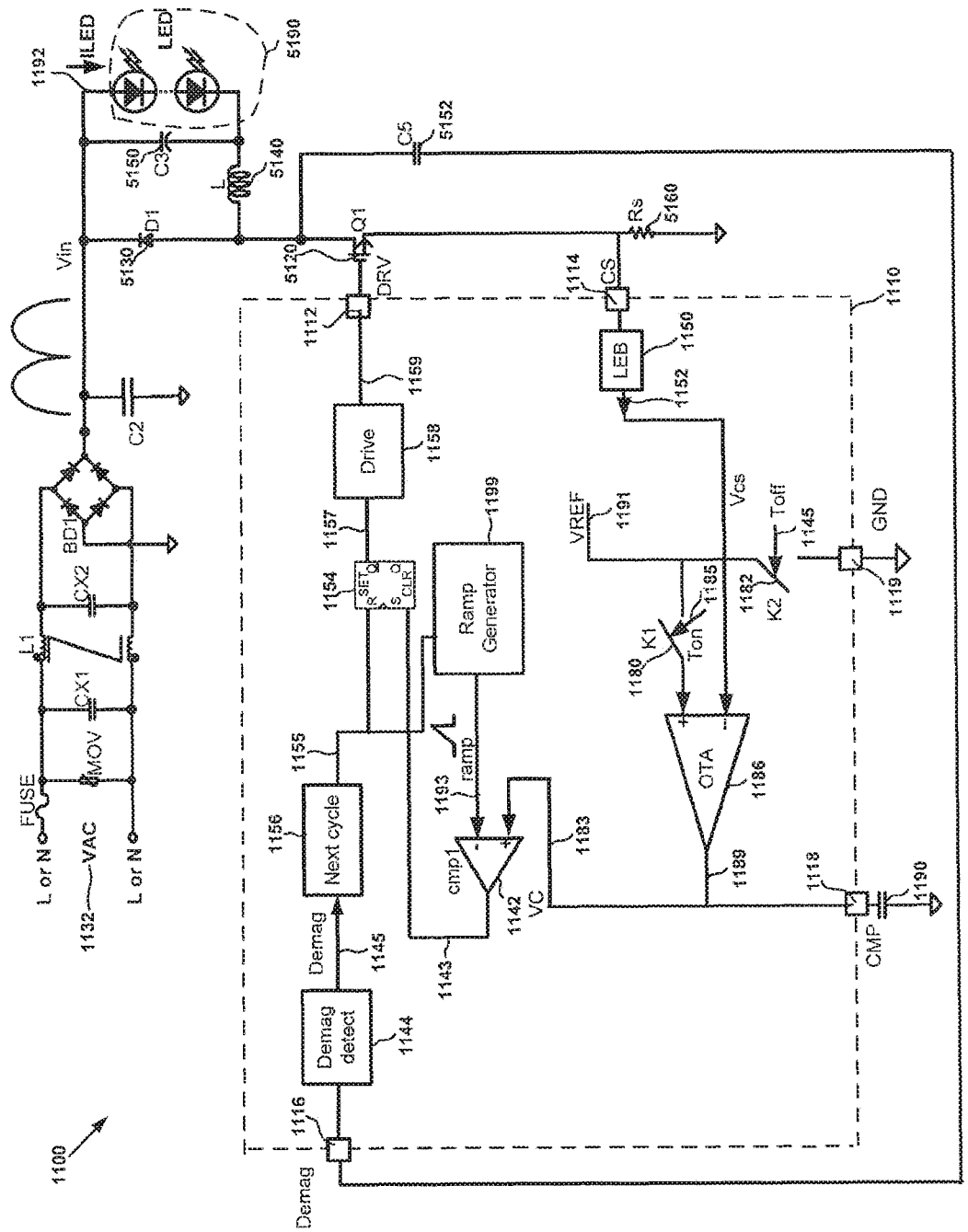

FIG. 11 is a simplified diagram for a LED lighting system according to yet another embodiment of the present invention.

Figure 12:
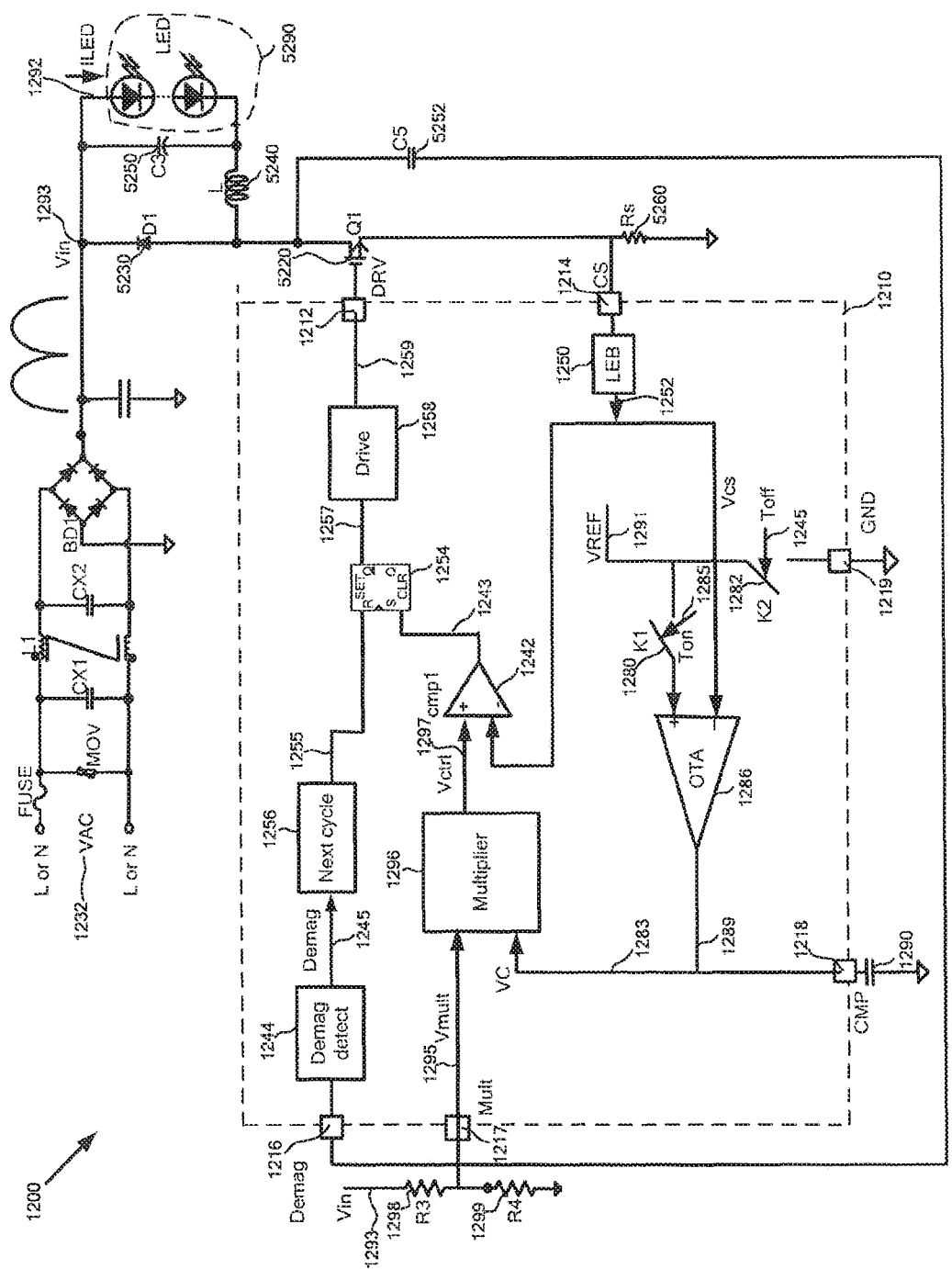

FIG. 12 is a simplified diagram for a LED lighting system according to yet another embodiment of the present invention.

5. DETAILED DESCRIPTION OF THE INVENTION

The present invention is directed to integrated circuits. More particularly, the invention provides lighting systems and methods for constant current control in various operation modes. Merely by way of example, the invention has been applied to one or more light emitting diodes. But it would be recognized that the invention has a much broader range of applicability.

Figure 1:
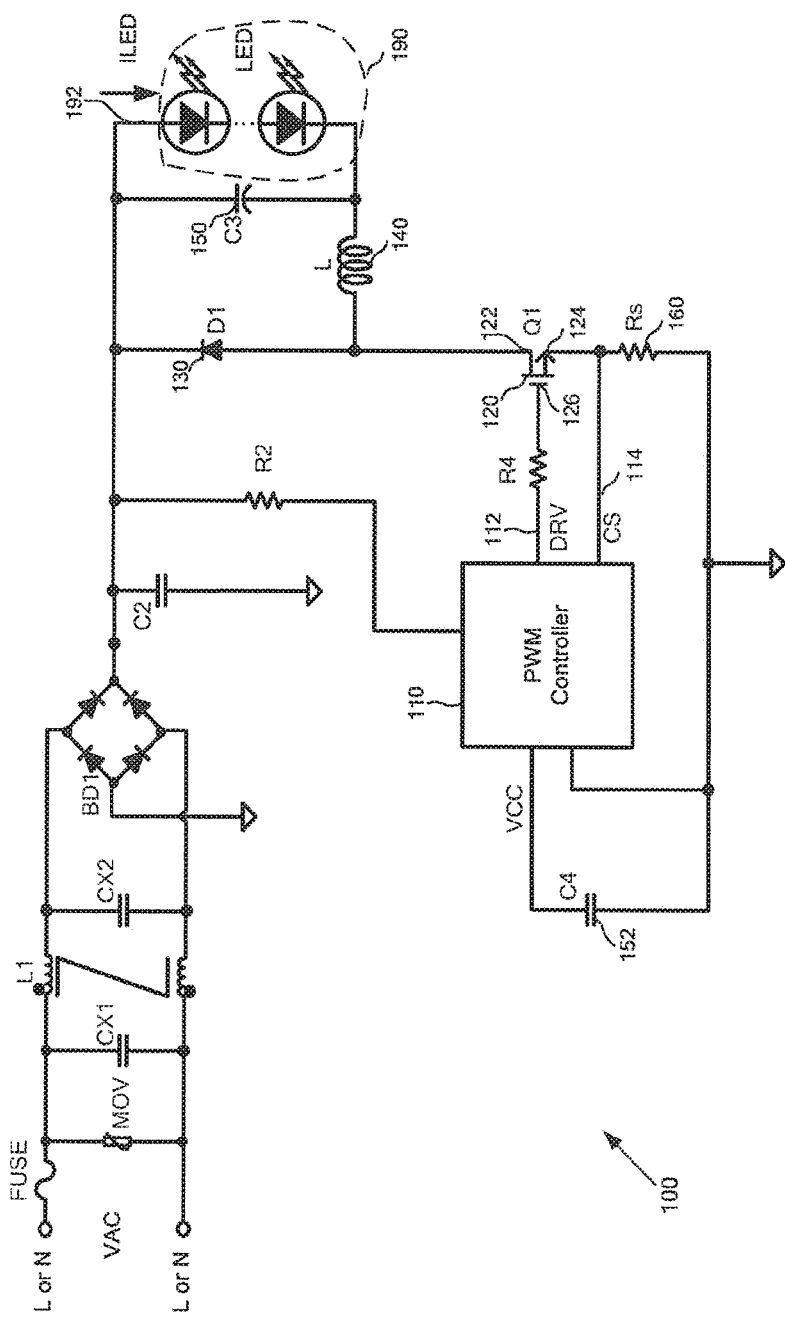
FIG. 1 is a simplified diagram showing a conventional LED lighting system with a Buck converter.
Figure 2:
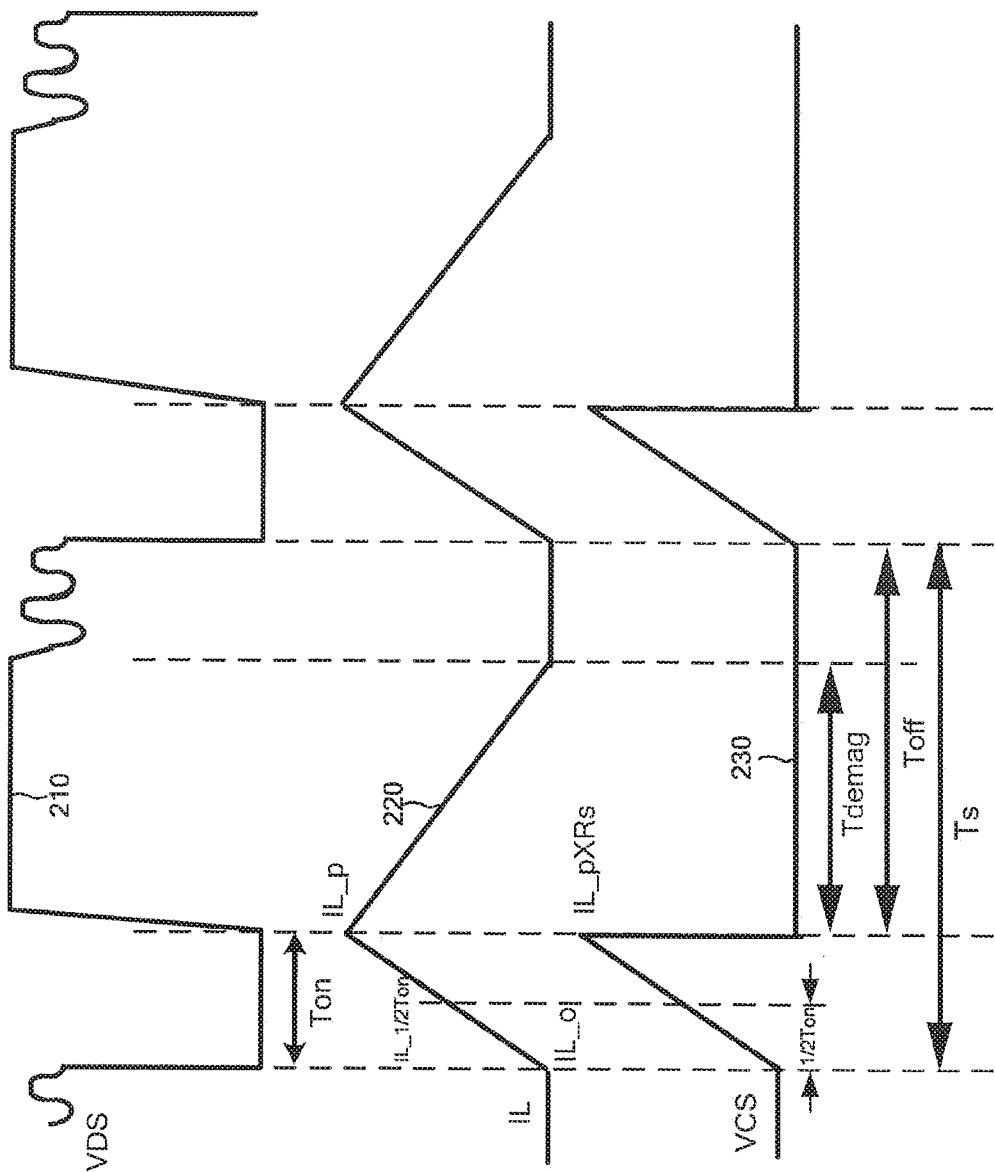
FIG. 2 is a simplified diagram showing an operation mechanism for the lighting system that operates in the discontinuous conduction mode (DCM).

FIG. 2 is a simplified diagram showing an operation mechanism for the lighting system 100 that operates in the discontinuous conduction mode (DCM). The waveform 210 represents a voltage between the terminals 122 and 124 (e.g., $V_{DS}$) as a function of time, the waveform 220 represents a current flowing through the inductor 140 (e.g. $I_L$) as a function of time, and the waveform 230 represents the current sensing signal 114 (e.g., $V_{CS}$) as a function of time.

For example, when the power switch 120 is turned on (e.g., during $T_{on}$), the inductor 140 is magnetized and the current that flows through the inductor 140 (e.g. $I_L$) flows through the power switch 120 and the sensing resistor 160. The sensing resistor 160 converts the inductor current (e.g. $I_L$) into the current sensing signal 114 (e.g., $V_{CS}$). In another example, when the power switch 120 is turned off (e.g., during $T_{off}$), the inductor 140 is demagnetized and the inductor current (e.g. $I_L$) flows through the diode 130, the capacitor 150, and the one or more LEDs 190. In yet another example, a lamp current 192 (e.g., an output current) that flows through the one or more LEDs 190 (e.g., $I_{LED}$) is equal to the average of the inductor current (e.g., the average of $I_L$). If the average of the inductor current is regulated to a predetermined level, the lamp current 192 is also regulated to the predetermined level. Therefore, the lamp current 192 can be estimated by sensing the inductor current (e.g. $I_L$) through the sensing resistor 160 and calculating the on-time of the power switch 120 (e.g., $T_{on}$).

As discussed above, the lighting system 100 attempts to control the lamp current 192 by controlling the peak magnitude of the inductor current (e.g. $I_L$). The lamp current 192 is equal to the average of the inductor current, but the relationship between the average of the inductor current and the peak magnitude of the inductor current depends on the input AC voltage (e.g., VAC). For example, if the conventional lighting system 100 operates, with a fixed switching frequency, in the continuous conduction mode (CCM) or the discontinuous conduction mode (DCM), the on-time should decrease with increasing input AC voltage (e.g., VAC) in order to control the peak magnitude of the inductor current. As a result, the average of the inductor current and the lamp current 192 also decrease with increasing input AC voltage. Therefore, the lamp current 192 does not remain constant with respect to various input AC voltages.

Figure 3:
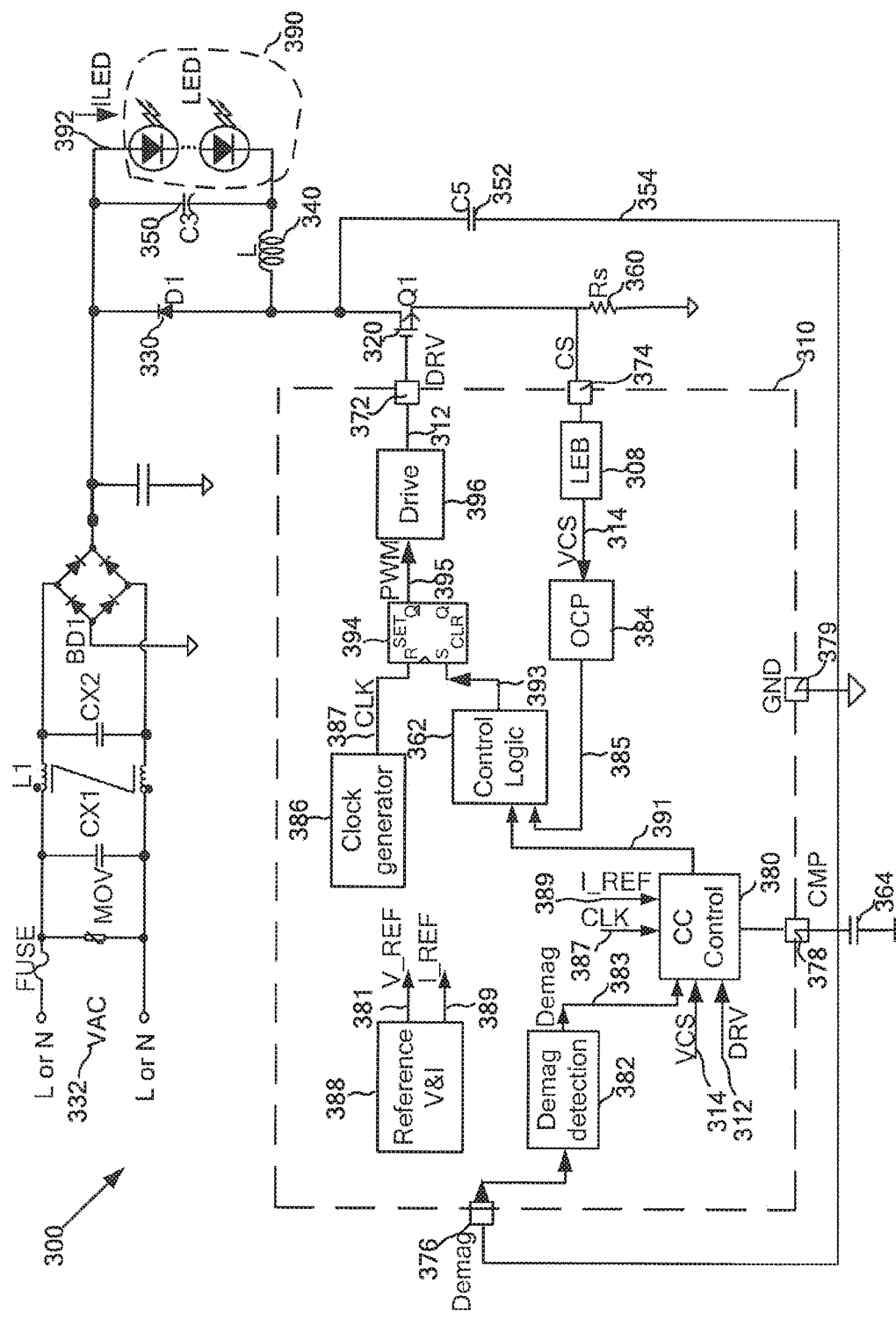
FIG. 3 is a simplified diagram showing an LED lighting system according to one embodiment of the present invention.

FIG. 3 is a simplified diagram showing an LED lighting system according to one embodiment of the present invention. This diagram is merely an example, which should not unduly limit the scope of the claims. One of ordinary skill in the art would recognize many variations, alternatives, and modifications. The lighting system 300 includes a pulse-width-modulation (PWM) controller 310, a switch 320, a diode 330, an inductor 340, capacitors 350 and 352, a sensing resistor 360, and a capacitor 364.

For example, the switch 320, the diode 330, the inductor 340, the capacitor 350, and the sensing resistor 360 are the same as the power switch 120, the diode 130, the inductor 140, the capacitor 150, and the sensing resistor 160, respectively. In another example, the switch 320 is a MOS transistor. In yet another example, the switch 320 is a bipolar transistor (e.g. an NPN bipolar transistor). In yet another example, the switch 320 is an insulated gate bipolar transistor (IGBT).

In one embodiment, the PWM controller 310 includes a constant-current control component 380, a demagnetization component 382, an over-current-protection (OCP) component 384, a clock generator 386, a reference signal generator 388, a logic component 362, a flip-flop component 394, a drive component 396, and a leading-edge-blanking component 308. In another embodiment, the PWM controller includes terminals 372, 374, 376, 378, and 379.

As shown in FIG. 3, the lighting system 300 receives an input voltage 332 and provides a lamp current 392 (e.g., an output current) and a lamp voltage to one or more LEDs 390. For example, the PWM controller 310 outputs a drive signal 312 through the terminal 372 to the switch 320. In another example, the drive signal 312 corresponds to a switching period (e.g., $T_s$). According to one embodiment, if the switch 320 is turned on (e.g., during $T_{on}$), the current that flows through the inductor 340 (e.g., $I_L$) is sensed by the sensing resistor 360, and consequently, a current sensing signal 314 (e.g., $V_{CS}$) is received by the over-current-protection (OCP) component 384 through the terminal 374 and the leading-edge-blanking component 308. For example, in response, the over-current-protection (OCP) component 384 generates a control signal 385.

According to another embodiment, the demagnetization component 382 receives a signal 354 through the terminal 376 from the capacitor 352, and in response generates a demagnetization signal 383. According to yet another embodiment, the clock generator 386 generates a clock signal 387, and the reference signal generator 388 generates a reference voltage signal 381 (e.g., $V_{REF}$) and a reference current signal 389 (e.g., $I_{REF}$).

In one embodiment, the drive signal 312, the current sensing signal 314, the demagnetization signal 383, the clock signal 387, and the reference current signal 389 are received by the constant-current control component 380 connected to the capacitor 364 (e.g., through the terminal 378). For example, in response, the constant-current control component 380 outputs a control signal 391 to the logic component 362. In another example, the logic component 362 receives the control signals 391 and 385 and outputs a logic signal 393. In another embodiment, the logic signal 393 is received by the flip-flop component 394, which also receives the clock signal 387 and generates a modulation signal 395. For example, the modulation signal 395 is received by the drive component 396. In another example, the drive component 396 generate the drive signal 312 based on at least the modulation signal 395.

The lighting system 300 can regulate the lamp current 392 that flows through the one or more LEDs 390 (e.g., ILEA) in various operation modes, such as the discontinuous conduction mode (DCM), the continuous conduction mode (CCM), and/or the critical conduction mode (CRM), according to certain embodiments. For example, the lamp current 392 is maintained at a constant level, regardless of the lamp voltage, the inductance of the inductor 340, and/or the input voltage 332.

FIGS. 4(A), (B), and (C) are simplified diagrams showing timing diagrams for the lighting system 300 that operates in the discontinuous conduction mode (DCM), the continuous conduction mode (CCM), and the critical conduction mode (CRM), respectively.

As shown in FIG. 4(A), in DCM, the off-time of the switch 320, $T_{off}$, is much longer than the demagnetization period, $T_{demag}$. The demagnetization process ends at point C, and the next switching cycle starts after the completion of the demagnetization process. The demagnetization period is determined as follows:

$$T_{demag} = \frac{I_{L\_p}}{(V_o/L)} = \frac{I_{L\_p} \times L}{V_o} \quad \text{(Equation 1)}$$

where $V_o$ represents the lamp voltage across the one or more LEDs 390, $I_{L\_p}$ represents the peak magnitude of the inductor current (e.g., $I_L$) at the end of the on-time of the switch 320. Additionally, L represents the inductance of the inductor 340. Moreover, as shown in FIG. 4(A), $I_{L\_0}$ represents the initial magnitude of the inductor current (e.g., $I_L$) at the beginning of the on-time of the switch 320, and is equal to zero.

In DCM, the lamp current 392, which is equal to the average inductor current, is as follows:

$$I_{out} = \frac{1}{2} \times I_{L\_p} \times \frac{T_{demag} + T_{on}}{T_s} \quad \text{(Equation 2)}$$

where $I_{out}$ represents the lamp current 392, and $T_{on}$ represents the on-time of the switch 320.

As shown in FIG. 4(B), in CCM, the next switching cycle starts before the demagnetization process is completed. The off-time of the switch 320, $T_{off}$, is shorter than the demagnetization period, $T_{demag}$. In CCM, the lamp current 392, which is equal to the average inductor current, is determined as follows:

$$I_{out} = \frac{1}{2} \times (I_{L\_0} + I_{L\_p}) \times \frac{T_{off} + T_{on}}{T_s} = \frac{1}{2} \times (I_{L\_0} + I_{L\_p}) \quad \text{(Equation 3)}$$

As shown in FIG. 4(C), in CRM, the demagnetization period, $T_{demag}$, is slightly shorter than the off-time of the switch, $T_{off}$. The demagnetization process ends at point C, and the next switching cycle starts shortly after the completion of the demagnetization process. The next switching cycle starts at a minimum voltage level (e.g., a valley) of the drain voltage of a MOS transistor switch or at a minimum voltage level (e.g., a valley) of the collector voltage of a bipolar transistor switch.

In CRM, the lamp current 392, which is equal to the average inductor current, is determined as follows:

$$I_{out} = \frac{1}{2} \times I_{L\_p} \times \frac{T_{demag} + T_{on}}{T_s}. \quad \text{(Equation 4)}$$

Since the demagnetization period, $T_{demag}$, is approximately equal to the off-time of the switch 320, $T_{off}$, and the initial magnitude of the inductor current (e.g., $I_L$) at the beginning of the on-time of the switch 320 is equal to zero, $$I_{out} \approx \frac{1}{2} \times I_{L\_p} \times \frac{T_{off} + T_{on}}{T_s} = \frac{1}{2} \times I_{L\_p}. \quad \text{(Equation 5)}$$

Referring to FIG. 3, the lamp current 392 is the averaged magnitude of the inductor current (e.g., $I_L$) in each switching cycle as follows:

$$I_{out} = \frac{1}{T} \times \int_0^T I_L(t)dt \quad \text{(Equation 6)}$$

where T represents an integration period, and $I_L$ represents the inductor current that flows through the inductor 340. For example, T is equal to or larger than $T_s$, which represents the switching period.

According to one embodiment, to achieve $$I_{out} = I_c \quad \text{(Equation 7)}$$

the following can be obtained with Equation 6:

$$\int_0^T I_L(t)dt = I_c \times T = \int_0^T I_c dt \quad \text{(Equation 8)}$$

where $I_c$ represents a constant current magnitude.

In another embodiment, in practice, if $$|\int_0^T I_L(t)dt - \int_0^T I_c dt| < C \quad \text{(Equation 9)}$$

where C is a predetermined threshold, then the constant lamp current 392 can be achieved or substantially achieved.

Referring to FIGS. 4(A), (B), and (C), as discussed above, the lamp current 392 is determined according to Equation 2, Equation 3, and Equation 4, for DCM, CCM and CRM, respectively. Additionally, for CCM and CRM, $$I_{out} = \frac{1}{T_s} \times \int_0^{T_s} I_L(t)dt = \frac{1}{T_{on}} \times \int_0^{T_{on}} I_L(t)dt. \quad \text{(Equation 10)}$$

Also referring to FIG. 3, the inductor current $I_L$ during the on-time of the switch 320 as shown in Equation 10 is converted by the sensing resistor 360 into the current sensing signal 314, which is received by the PWM controller 310 through the terminal 374.

According to another embodiment, for DCM, CCM and CRM, $$(I_{L\_p}(i) + I_{L\_0}(i)) \times (T_{demag}(i) + T_{on}(i)) = I_c(i) \times T_s(i) \quad \text{(Equation 11A)}$$

or $(2 \times I_{L\_Ton/2}(i)) \times (T_{demag}(i) + T_{on}(i)) = I_c(i) \times T_s(i) \quad \text{(Equation 11B)}$ where i corresponds to the $i^{th}$ switching cycle. Additionally, $I_{L\_Ton/2}$ represents the magnitude of the inductor current (e.g., $I_L$) at the middle of the on-time of the switch 320.

Also, since in CCM, the next switching cycle starts before the demagnetization process is completed, the actual length of the demagnetization process before the next switching cycle starts is limited to the off-time of the switch; hence $T_{off}$ can be represented by $T_{demag}$ in CCM.

For example, if $$\text{Limit}_{N\to\infty}\left\|\left(\sum_{i=0}^{N}(I_{L\_p}(i)+I_{L\_0}(i))\times(T_{demag}(i)+T_{on}(i))-\sum_{i=0}^{N}I_c(i)\times T_s(i)\right)\right\|<C \quad \text{(Equation 12A)}$$

or $$\text{Limit}_{N\to\infty}\left\|\left(\sum_{i=0}^{N}(2\times I_{L\_Ton/2}(i))\times(T_{demag}(i)+T_{on}(i))-\sum_{i=0}^{N}I_c(i)\times T_s(i)\right)\right\|<C \quad \text{(Equation 12B)}$$

where C is a predetermined threshold, then the constant lamp current can be achieved.

In another example, Equation 12A is rewritten into an integration format as follows:

$$|\int[I_{L\_p}(i)+I_{L\_0}(i)]\times[U(t-T_s(i))-U(t-T_s(i)-T_{demag}(i))]dt - \int I_c(t)dt| < C \quad \text{(Equation 13)}$$

where U(t) is the unit step function, and $I_c(t)$ is equal to a constant $I_{c\_ref}$. Hence, in the steady state, the following can be obtained:

$$|\int[I_{L\_p}(i)+I_{L\_0}(i)]\times[U(t-T_s(i))-U(t-T_s(i)-T_{demag}(i))]dt - \int I_{c\_ref}dt| < C \quad \text{(Equation 14A)}$$

In yet another example, Equation 12B can be rewritten into an integration format, and hence, in the steady state, the following can be obtained:

$$|\int[2-I_{L\_Ton/2}]\times[U(t-T_s(i))-U(t-T_s(i)-T_{demag}(i))]dt - \int I_{c\_ref}dt| < C \quad \text{(Equation 14B)}$$

In one embodiment, referring to Equations 2, 3 and 4, for DCM, CCM and CRM, $$I_{out} = \frac{1}{2}\times(I_{L\_0}+I_{L\_p})\times\frac{T_{demag}+T_{on}}{T_s} \quad \text{(Equation 15)}$$

where $T_{demag}$ represents $T_{off}$ for CCM, and $I_{L\_0}$ is equal to zero for DCM and CRM.

For example, if the lamp current 392 is maintained at a constant level, e.g., $$I_{out} = \frac{1}{2}\times I_{ref} \quad \text{(Equation 16)}$$

then $$(I_{L\_p}+I_{L\_0})\times\frac{T_{demag}+T_{on}}{T_s} = I_{ref} \quad \text{(Equation 17)}$$

where $I_{ref}$ represents a constant current level. Hence, $$(I_{L\_p}+I_{L\_0})\times(T_{demag}+T_{on}) = I_{ref}\times T_s \quad \text{(Equation 18)}$$

In another example, $T_s$, $T_{demag}$, and $T_{on}$ may vary from one switching cycle to another switching cycle, so for the $i^{th}$ switching cycle, the following may be obtained:

$$(I_{L\_p}(i)+I_{L\_0}(i))\times(T_{demag}(i)+T_{on}(i))\neq I_{ref}\times T_s(i) \quad \text{(Equation 19)}$$

But if $$\text{Limit}_{N\to\infty}\left\|\left(\sum_{i=0}^{N}(I_{L\_p}(i)+I_{L\_0}(i))\times(T_{demag}(i)+T_{on}(i))-\sum_{i=0}^{N}I_{ref}\times T_s(i)\right)\right\|<A \quad \text{(Equation 20A)}$$

where A represents a predetermined threshold, the following integration format can be obtained:

$$|\int[I_{L\_p}(i)+I_{L\_0}(i)]\times[U(t-T_s(i))-U(t-T_s(i)-T_{on}(i)-T_{demag}(i))]dt - \int I_{ref}dt| < A \quad \text{(Equation 21A)}$$

where U(t) is the unit step function.

In yet another example, if $$\text{Limit}_{N\to\infty}\left\|\left(\sum_{i=0}^{N}(2\times I_{L\_Ton/2}(i))\times(T_{demag}(i)+T_{on}(i))-\sum_{i=0}^{N}I_{ref}\times T_s(i)\right)\right\|<A \quad \text{(Equation 20B)}$$

where A represents a predetermined threshold, the following integration format can be obtained:

$$|\int(2-I_{L\_Ton/2}(i))\times[U(t-T_s(i))-U(t-T_s(i)-T_{on}(i)-T_{demag}(i))]dt - \int I_{ref}dt| < A \quad \text{(Equation 21B)}$$

where U(t) is the unit step function.

According to yet another embodiment, if Equations 20A and 21A are satisfied and/or Equations 20B and 21B are satisfied, the lamp current 392 is maintained at a constant level, regardless of the lamp voltage, the inductance of the inductor 340, and/or the input voltage 332.

For example, referring to FIG. 3, when the switch 320 is turned on (e.g., during $T_{on}$), the current that flows through the inductor 340 (e.g. $I_L$) is sensed by the sensing resistor 360, which generates the current sensing signal 314 (e.g., $V_{cs}$) as follows:

$$V_{cs} = I_L \times R_s \quad \text{(Equation 22)}$$

where $V_{cs}$ represents the current sensing signal 314, $I_L$ represents the current that flows through the inductor 340, and $R_s$ represents the resistance of the sensing resistor 360.

In another example, based on Equations 21(A) and 22, one can obtain the following:

$$\left|\frac{1}{R_s}\int(V_{cs\_p}(i)+I_{cs\_0}(i))\times[U(t-T_s(i))-U(t-T_s(i)-T_{on}(i)-T_{demag}(i))]dt - \int I_{ref}dt\right| < A \quad \text{(Equation 23A)}$$

where $V_{cs\_p}$ represents the peak magnitude of the current sensing signal 314, and corresponds to the peak magnitude of the inductor current at the end of the on-time of the switch 320. Additionally, $V_{cs\_0}$ represents the initial magnitude of the current sensing signal 314, and corresponds to the initial magnitude of the inductor current at the beginning of the on-time of the switch 320.

In yet another example, based on Equations 21(B) and 22, one can obtain the following:

$$\left| \frac{1}{R_s} \int (2 \times V_{cs\_Ton/2}(i)) \times [U(t - T_s(i)) - U(t - T_s(i) - T_{on}(i) - T_{demag}(i))] dt - \int I_{ref} dt \right| < A \quad \text{(Equation 23B)}$$

where $V_{cs\_Ton/2}$ represents the magnitude of the current sensing signal 314 at the middle of the on-time of the switch 320.

As discussed above and further emphasized here, FIG. 3 is merely an example, which should not unduly limit the scope of the claims. One of ordinary skill in the art would recognize many variations, alternatives, and modifications. For example, FIG. 3 is implemented according to FIG. 5, FIG. 6, FIG. 7, FIG. 8, FIG. 9, FIG. 10, FIG. 11, and/or FIG. 12. In another example, the leading-edge-blanking component 308 is removed, and the current sensing signal 314 (e.g., $V_{cs}$) is received by the over-current-protection (OCP) component 384 through the terminal 374 without going through the leading-edge-blanking component 308.

FIG. 5 is a simplified diagram for a LED lighting system according to another embodiment of the present invention. This diagram is merely an example, which should not unduly limit the scope of the claims. One of ordinary skill in the art would recognize many variations, alternatives, and modifications. The lighting system 500 includes a switch 420, a diode 430, an inductor 440, capacitors 450 and 452, and a sensing resistor 460. Additionally, the lighting system 500 also includes cycle-by-cycle processing components 520 and 522, a capacitor 530, a signal conditioning component 532, a transconductance amplifier 540, a comparator 542, a demagnetization detection component 544, a leading-edge blanking component 550, a flip-flop component 554, a clock generator 556, and a driver component 558.

For example, the switch 420, the diode 430, the inductor 440, the capacitor 450, and the sensing resistor 460 are the same as the power switch 120, the diode 130, the inductor 140, the capacitor 150, and the sensing resistor 160, respectively. In another example, the cycle-by-cycle processing components 520 and 522, the signal conditioning component 532, the transconductance amplifier 540, the comparator 542, the demagnetization detection component 544, the leading-edge blanking component 550, the flip-flop component 554, the clock generator 556, and the driver component 558 are located on a chip 510. In yet another example, the capacitor 530 is located off the chip 510. In yet another example, the chip 510 includes terminals 512, 514, 516, 518, and 519.

As shown in FIG. 5, the lighting system 500 receives an input voltage 534 and provides a lamp current 592 (e.g., an output current) and a lamp voltage to one or more LEDs 590. According to one embodiment, during the on-time of the switch 420 (e.g., $T_{on}$), a current that flows through the inductor 440 and the switch 420 is sensed by the resistor 460. For example, the resistor 460 generates, through the terminal 514 and with the leading-edge blanking component 550, a current sensing signal 552. In another example, during the on-time of the switch 420 (e.g., $T_{on}$), the current sensing signal 552 is as follows:

$$V_{cs} = I_L \times R_s \quad \text{(Equation 24)}$$

where $V_{cs}$ represents the current sensing signal 552, $I_L$ represents the current that flows through the inductor 440, and $R_s$ represents the resistance of the resistor 460.

In yet another example, combining Equations 20A and 24, the following is obtained:

$$Limit_{N \to \infty} \left| \left( \frac{1}{R_s} \sum_{i=0}^{N} (V_{cs\_p}(i) + V_{cs\_0}(i)) \times (T_{demag}(i) + T_{on}(i)) - \sum_{i=0}^{N} I_{ref} \times T_s(i) \right) \right| < A \quad \text{(Equation 25A)}$$

where A represents a predetermined threshold, and $I_{ref}$ represents a predetermined referenced current. Additionally, $V_{cs\_p}$ represents the peak magnitude of the current sensing signal 552, which, for example, corresponds to the peak magnitude of the inductor current at the end of the on-time of the switch 420. Moreover, $V_{cs\_0}$ represents the initial magnitude of the current sensing signal 552, which, for example, corresponds to the initial magnitude of the inductor current at the beginning of the on-time of the switch 420. Also, $T_s$ represents the switching period of the switch 420, and $T_{on}$ represents the on-time of the switch 420. Additionally, $T_{demag}$ represents the demagnetization period for DCM and CRM, and $T_{demag}$ represents the off-time of the switch 420 (e.g., $T_{off}$) for CCM.

In yet another example, combining Equations 20B and 24, the following is obtained:

$$Limit_{N \to \infty} \left| \left( \frac{1}{R_s} \sum_{i=0}^{N} (2 \times V_{cs\_Ton/2}(i)) \times (T_{demag}(i) + T_{on}(i)) - \sum_{i=0}^{N} I_{ref} \times T_s(i) \right) \right| < A \quad \text{(Equation 25B)}$$

where A represents a predetermined threshold, and $I_{ref}$ represents a predetermined referenced current. Additionally, $V_{cs\_Ton/2}$ represents the magnitude of the current sensing signal 552 at the middle of the on-time of the switch 420. Also, $T_s$ represents the switching period of the switch 420, and $T_{on}$ represents the on-time of the switch 420. Additionally, $T_{demag}$ represents the demagnetization period for DCM and CRM, and $T_{demag}$ represents the off-time of the switch 420 (e.g., $T_{off}$) for CCM.

According to some embodiments, the current sensing signal 552 is received by the cycle-by-cycle processing component 520. In one embodiment, for each switching cycle, the processing component 520 generates a signal 521 that is equal to $(I_{L\_p} + I_{L\_0}) \times (T_{on} + T_{demag})$. In another embodiment, for each switching cycle, the processing component 520 generates a signal 521 that is equal to $(I_{L\_p} + I_{L\_0}) \times (T_{on}) + (2 \times I_{L\_Ton/2}) \times (T_{demag})$.

For example, for each switching cycle, the average inductor current during the on-time of the switch 420 (e.g., $T_{on}$) is determined directly based on the sensed current 552 as $\frac{1}{2}(I_{L\_p} + I_{L\_0})$ when the switch 420 is closed. In another example, for each switching cycle, the average inductor current during the demagnetization period (e.g., $T_{demag}$) is determined indirectly based on the sensed current 552 at the middle of the on-time as $I_{L\_Ton/2}$, which is sampled when the switch 420 is closed and then held by the cycle-by-cycle processing component 520. In yet another example, for each switching cycle, the average inductor current during the off-time (e.g., $T_{off}$) is determined indirectly based on the sensed current 552 at the middle of the on-time as $(I_{L\_Ton/2}) \times (T_{demag})/(T_{off})$ and $I_{L\_Ton/2}$ is sampled when the switch 420 is closed and then held by the cycle-by-cycle processing component 520. For DCM and CRM, the demagnetization period (e.g., $T_{demag}$) represents duration of the demagnetization process, but for CCM, the demagnetization period (e.g., $T_{demag}$) represents duration of the off-time according to certain embodiments.

In yet another example, for each switching cycle, the processing component 522 generates a signal 523 that is equal to $I_{ref} \times T_s$. In yet another example, the demagnetization detection component 544 receives a feedback signal 564 from the capacitor 452, and generates a Demag signal 545. The Demag signal 545 has a pulse width of $T_{demag}$ for each switching cycle.

According to another embodiment, the signals 523 and 521 are received by the transconductance amplifier 540. For example, the magnitude difference of $I_{ref} \times T_s - (I_{L\_p} + I_{L\_0}) \times (T_{on} + T_{demag})$ is amplified and integrated by the transconductance amplifier 540 and the capacitor 530 as part of the practical implementation of Equation 25A. In another example, the magnitude difference of $I_{ref} \times T_s - \lfloor (I_{L\_p} + I_{L\_0}) \times (T_{on}) + (2 \times I_{L\_Ton/2}) \times (T_{demag}) \rfloor$ is amplified and integrated by the transconductance amplifier 540 and the capacitor 530 as part of the practical implementation of Equation 25B. In another example, the transconductance amplifier 540 and the capacitor 530 form an integrator, which generates a signal 531 that is received by the comparator 542 directly or indirectly through the signal conditioning component 532.

According to yet another embodiment, the comparator 542 also receives the current sensing signal 552, and in response generates a comparison signal 543. For example, the comparison signal 543 is received by the flip-flop component 554, and the flip-flop component 554 also receives a clock signal 555 from the clock generator 556 and generates a modulation signal 557. In another example, the modulation signal 557 is received by the driver component 558, which in response generates the drive signal 559.

In one embodiment, the drive signal 559 is sent to the switch 420 through the terminal 512, and is also received by the cycle-by-cycle processing component 520. In another embodiment, the signal 531 is used to adjust the pulse width of the drive signal 559 with pulse-width modulation.

As discussed above and further emphasized here, FIG. 5 is merely an example, which should not unduly limit the scope of the claims. One of ordinary skill in the art would recognize many variations, alternatives, and modifications. For example, the signal conditioning component 532 is removed, and the signal 531 is received directly by the comparator 542. In another example, the leading-edge blanking component 550 is removed, and the signal 552 is received directly from the terminal 514. In yet another example, the capacitor 530 is located on the chip 510. In yet another example, for CRM, the clock generator 556 is replaced by a pulse signal generator, which receives the Demag signal 545 and in response generates pulses of a pulse signal 555. In yet another example, the pulse signal 555 is received by the flip-flop component 554, and different pulses of the pulse signal 555 correspond to different switching cycles.

FIG. 6 is a simplified diagram for a LED lighting system according to yet another embodiment of the present invention. This diagram is merely an example, which should not unduly limit the scope of the claims. One of ordinary skill in the art would recognize many variations, alternatives, and modifications. The lighting system 600 includes a switch 4620, a diode 4630, an inductor 4640, capacitors 4650 and 4652, and a sensing resistor 4660. Additionally, the lighting system 600 also includes a comparator 642, a demagnetization detection component 644, a leading-edge blanking component 650, a flip-flop component 654, a clock generator 656, and a driver component 658. Moreover, the lighting system 600 also includes sampling-and-holding components 662 and 664, voltage-to-current converters 660, 666 and 668, a switch 680, and a capacitor 690. Also, the lighting system 600 further includes a signal amplifier 686, a voltage-to-current converter 688, and a switch 682.

For example, the switch 4620, the diode 4630, the inductor 4640, the capacitor 4650, and the sensing resistor 4660 are the same as the power switch 120, the diode 130, the inductor 140, the capacitor 150, and the sensing resistor 160, respectively. In another example, the comparator 642, the demagnetization detection component 644, the leading-edge blanking component 650, the flip-flop component 654, the clock generator 656, the driver component 658, the sampling-and-holding components 662 and 664, the voltage-to-current converters 660, 666 and 668, the switch 680, the signal amplifier 686, the voltage-to-current converter 688, and the switch 682 are located on a chip 610. In yet another example, the capacitor 690 is located off the chip 610. In yet another example, the chip 610 includes terminals 612, 614, 616, 618, and 619.

According to one embodiment, in CCM, the next switching cycle starts before the demagnetization process is completed. For example, the actual length of the demagnetization process (e.g., $T_{demag}$) before the next switching cycle starts is limited to the off-time of the switch 4620 (e.g., $T_{off}$); hence $T_{off}$ can be represented by $T_{demag}$ in CCM. According to another embodiment, in DCM, the off-time of the switch 4620 (e.g., $T_{off}$) is much longer than the demagnetization period (e.g., $T_{demag}$). According to yet another embodiment, in CRM, the off-time of the switch 4620 (e.g., $T_{off}$) is slightly longer than the demagnetization period (e.g., $T_{demag}$).

As shown in FIG. 6, the lighting system 600 receives an input voltage 632 and provides a lamp current 692 (e.g., an output current) and a lamp voltage to one or more LEDs 4690. In one embodiment, a current that flows through the inductor 4640 is sensed by the resistor 4660. For example, the resistor 4660 generates, through the terminal 614 and with the leading-edge blanking component 650, a current sensing signal 652.

In another embodiment, the sampling-and-holding component 662 receives at least a drive signal 659 and a control signal 661. For example, the control signal 661 includes, for each switching cycle, a pulse that has a rising edge at the beginning of the on-time of the switch 4620 (e.g., at the rising edge of the drive signal 659). In another example, during the pulse, the current sensing signal 652 (e.g., $V_{cs}$) is sampled and held as a voltage signal 663 (e.g., $V_{s2}$). In yet another example, after the falling edge of the pulse, the voltage signal 663 remains constant (e.g., being equal to $V_{cs\_0}$) until the next pulse of the control signal 661. In one embodiment, the pulse of the control signal 661 is so narrow that $V_{cs\_0}$ equals approximately and thus represents the current sensing signal 652 at the beginning of the on-time of the switch 4620.

In yet another embodiment, the sampling-and-holding component 664 receives at least the drive signal 659, which includes, for each switching cycle, a pulse that has a width corresponding to the on-time of the switch 4620 (e.g., $T_{on}$). For example, during the pulse of the drive signal 659, the current sensing signal 652 (e.g., $V_{cs}$) is sampled and held as a voltage signal 665 (e.g., $V_{s3}$). In another example, after the falling edge of the pulse, the voltage signal 665 remains constant (e.g., being equal to $V_{cs\_p}$) until the next pulse of the drive signal 659.

As shown in FIG. 6, the voltage signals 663 and 665 are received by the voltage-to-current converters 666 and 668, which in response generate current signals 667 and 669, respectively, according to one embodiment. For example, the current signal 667 is represented by $I_{s2}$, and the current signal 669 is represented by $I_{s3}$. In another example, the sum of the current signals 667 and 669 forms a sinking current 681 (e.g., $I_{sink2}$), which is used to discharge the capacitor 690 if the switch 680 is closed.

According to another embodiment, the switch 680 is controlled by a Demag signal 645, which is generated by the demagnetization detection component 644. For example, if the Demag signal 645 is at the logic high level, the switch 680 is closed. In another example, the switch 680 is closed during the demagnetization period and is open during the rest of the switching period. In yet another example, the sinking current 681 discharges the capacitor 690 during the demagnetization period (e.g., during $T_{demag}$).

Also, as shown in FIG. 6, the signal amplifier 686 receives the current sensing signal 652 (e.g., $V_{cs}$) and generates a voltage signal 687 (e.g., $V_{s1}$) according to one embodiment. For example, the voltage signal 687 (e.g., $V_{s1}$) equals two times the current sensing signal 652 (e.g., $V_{cs}$) in magnitude. According to another embodiment, the voltage signal 687 is received by the voltage-to-current converter 688, which in response generates a sinking current 689 (e.g., $I_{sink1}$). For example, the sinking current 689 is used to discharge the capacitor 690 if the switch 682 is closed.

According to yet another embodiment, the switch 682 is controlled by a signal 685, which has been generated based on the signal 659. For example, if the signal 685 is at the logic high level, the switch 682 is closed, and if the signal 685 is at the logic low level, the switch 682 is open. In another example, the switch 682 is closed during the on-time of the switch 4620, and is open during the off-time of the switch 4620. In yet another example, the sinking current 689 discharges the capacitor 690 during the on-time of the switch 4620. According to yet another embodiment, the voltage-to-current converter 660 receives a predetermined voltage signal 691 (e.g., $V_{ref}$), and in response generates a charging current 661 (e.g., $I_{ref}$). For example, the charging current 661 charges the capacitor 690 during the switching period (e.g., during $T_s$). According to yet another embodiment, the signal 683 (e.g., $V_C$) is generated by the charging current 661 (e.g., $I_{ref}$), the discharging current 681 (e.g., $I_{sink2}$), and the discharging current 689 (e.g., $I_{sink1}$) for the capacitor 690. For example, the signal 683 (e.g., $V_C$) decreases in magnitude during the demagnetization period (e.g., during $T_{demag}$), and increases during the rest of the switching cycle.

In one embodiment, the comparator 642 receives the signal 683 (e.g., $V_C$) and also receives the current sensing signal 652 through the slope compensation component 684. For example, in response, the comparator 642 generates a comparison signal 643, which is received by the flip-flop component 654. In another example, the flip-flop component 654 also receives a clock signal 655 from the clock generator 656 and generates a modulation signal 657. In yet another example, the modulation signal 657 is received by the driver component 658, which in response outputs the drive signal 659 to the switch 4620 and the sampling-and-holding components 662 and 664.

According to one embodiment, for CCM, DCM and CRM, $$I_{s2} = \alpha \times V_{cs\_0} = \alpha \times I_{L\_0} \times R_s \quad \text{(Equation 26)}$$

$$\text{and } I_{s3} = \alpha \times V_{cs\_p} = \alpha \times I_{L\_p} \times R_s \quad \text{(Equation 27)}$$

$$\text{Hence } I_{sink2} = I_{s2} + I_{s3} \alpha \times I_{L\_0} \times R_s + \alpha \times I_{L\_p} \times R_s \quad \text{(Equation 28)}$$

$$\text{Additionally, } I_{sink1} = 2 \times \alpha \times V_{cs} \quad \text{(Equation 29)}$$

where α is a constant related to the voltage-to-current converters 666, 668 and 688, and $R_s$ is the resistance of the sensing resistor 4660.

According to another embodiment, if, within each switching cycle, the charging and the discharging of the capacitor 690 are equal, the lighting system 600 reaches the equilibrium (e.g., the steady state), as follows:

$$I_{ref} \times T_s = \tfrac{1}{2} \times I_{sink1\_p} \times T_{on} + I_{sink2} \times T_{demag} \quad \text{(Equation 30)}$$

$$\text{where } I_{sink1\_p} = 2 \times \alpha \times V_{cs\_p} \quad \text{(Equation 31)}$$

Combining Equations 28-31, the following can be obtained:

$$I_{ref} = \alpha \times R_s \times (I_{L\_0} + I_{L\_p}) \times \frac{(T_{on} + T_{demag})}{T_s}. \quad \text{(Equation 32A)}$$

$$\text{If } I_{ref} = \beta \times V_{ref} \quad \text{(Equation 33A)}$$

$$(I_{L\_0} + I_{L\_p}) \times \frac{(T_{on} + T_{demag})}{T_s} = \frac{\beta \times V_{ref}}{\alpha \times R_s} \quad \text{(Equation 34A)}$$

where β is a constant related to the voltage-to-current converter 660.

$$\text{Since } I_{out} = \frac{1}{2} \times (I_{L\_0} + I_{L\_p}) \times \frac{T_{demag} + T_{on}}{T_s} \quad \text{(Equation 35A)}$$

$$\text{then } I_{out} = \frac{\beta}{2 \times \alpha \times R_s} \times V_{ref} \quad \text{(Equation 36A)}$$

where $I_{out}$ represents the lamp current 692. According to yet another embodiment, α, β, $R_s$, and $V_{ref}$ are all constants, so the constant lamp current 692 is achieved.

As discussed above and further emphasized here, FIG. 6 is merely an example, which should not unduly limit the scope of the claims. One of ordinary skill in the art would recognize many variations, alternatives, and modifications. In one embodiment, the leading-edge blanking component 650 is removed, and the signal 652 is received directly from the terminal 614. In another embodiment, the capacitor 690 is located on the chip 610. In yet another embodiment, a low-pass filter and/or a buffer are added to process the signal 683 before the signal 683 is received by the comparator 642. For example, a voltage divider (e.g., formed by two resistors) is further added to divide the processed signal 683 before the processed signal 683 is received by the comparator 642.

According to another embodiment, for DCM and CRM, $V_{cs\_0}$ is equal to zero, so the sampling-and-holding component 662 and the voltage-to-current converter 666 are removed if the lighting system 600 does not need to operate in CCM for constant lamp current 692. According to yet another embodiment, for CRM, the clock generator 656 is replaced by a pulse signal generator, which receives the Demag signal 645 and in response generates pulses of a pulse signal 655. For example, the pulse signal 655 is received by the flip-flop component 654, and different pulses of the pulse signal 655 correspond to different switching cycles.

According to yet another embodiment, the lighting system 600 is modified so that the following can be obtained:

$$I_{ref} = \alpha \times R_s \times (2 \times I_{L\_Ton/2}) \times \frac{(T_{on} + T_{demag})}{T_s}. \quad \text{(Equation 32B)}$$

If $I_{ref} = \beta \times V_{ref}$ (Equation 33B)

$$(2 \times I_{L\_Ton/2}) \times \frac{(T_{on} + T_{demag})}{T_s} = \frac{\beta \times V_{ref}}{\alpha \times R_s} \quad \text{(Equation 34B)}$$

where β is a constant related to the voltage-to-current converter 660.

Since $$I_{out} = (I_{L\_Ton/2}) \times \frac{T_{demag} + T_{on}}{T_s} \quad \text{(Equation 35B)}$$

then $I_{out} = \frac{\beta}{2 \times \alpha \times R_s} \times V_{ref}$ (Equation 36B)

where $I_{out}$ represents the lamp current 692. α, β, $R_s$, and $V_{ref}$ are all constants, so the constant lamp current 692 is achieved according to certain embodiments.

FIG. 7 is a simplified diagram for a LED lighting system according to yet another embodiment of the present invention. This diagram is merely an example, which should not unduly limit the scope of the claims. One of ordinary skill in the art would recognize many variations, alternatives, and modifications. The lighting system 700 includes a switch 4720, a diode 4730, an inductor 4740, a capacitor 4750, and a sensing resistor 4760. Additionally, the lighting system 700 also includes a comparator 742, a leading-edge blanking component 750, a flip-flop component 754, a clock generator 756, and a driver component 758. Moreover, the lighting system 700 also includes voltage-to-current converters 760 and 788, switches 780 and 782, a capacitor 790, and a signal amplifier 786.

For example, the switch 4720, the diode 4730, the inductor 4740, the capacitor 4750, and the sensing resistor 4760 are the same as the power switch 120, the diode 130, the inductor 140, the capacitor 150, and the sensing resistor 160, respectively. In another example, the comparator 742, the leading-edge blanking component 750, the flip-flop component 754, the clock generator 756, the driver component 758, the voltage-to-current converters 760 and 788, the switches 780 and 782, and the signal amplifier 786 are located on a chip 710. In yet another example, the capacitor 790 is located off the chip 710. In yet another example, the chip 710 includes terminals 712, 714, 718, and 719.

As shown in FIG. 7, the lighting system 700 receives an input voltage 732 and provides a lamp current 792 (e.g., an output current) and a lamp voltage to one or more LEDs 4790. In one embodiment, a current that flows through the inductor 4740 is sensed by the resistor 4760. For example, the resistor 4760 generates, through the terminal 714 and with the leading-edge blanking component 750, a current sensing signal 752.

In another embodiment, the signal amplifier 786 receives the current sensing signal 752 (e.g., $V_{cs}$) and generates a voltage signal 787 (e.g., $V_{s1}$). For example, the voltage signal 787 (e.g., $V_{s1}$) equals two times the current sensing signal 752 (e.g., $V_{cs}$) in magnitude. In yet another embodiment, the gain of the signal amplifier 786 is G (e.g. G being a predetermined positive number). In yet another embodiment, the voltage signal 787 is received by the voltage-to-current converter 788, which in response generates a sinking current 789 (e.g., $I_{sink1}$). For example, the sinking current 789 is used to discharge the capacitor 790 if the switch 782 is closed. In another example, the switch 782 is controlled by a signal 785, which has been generated based on a drive signal 759.

In yet another embodiment, the voltage-to-current converter 760 receives a predetermined voltage signal 791 (e.g., $V_{ref}$), and in response generates a charging current 761 (e.g., $I_{ref}$). For example, the charging current 761 is used to charge the capacitor 790 if the switch 780 is closed. In another example, the switch 780 is controlled by the signal 785, which has been generated based on the drive signal 759.

According to one embodiment, if the signal 785 is at the logic high level, the switches 780 and 782 are closed, and if the signal 785 is at the logic low level, the switches 780 and 782 are open. For example, the switches 780 and 782 are closed during the on-time of the switch 4720, and are open during the off-time of the switch 4720. In another example, the sinking current 789 discharges the capacitor 790 and the charging current 761 charges the capacitor 790 during the on-time of the switch 4720. According to another embodiment, the signal 783 (e.g., $V_C$) is generated by the charging current 761 (e.g., $I_{ref}$) and the discharging current 789 (e.g., $I_{sink1}$) for the capacitor 790.

As shown in FIG. 7, the comparator 742 receives the signal 783 (e.g., $V_C$) and also receives the current sensing signal 752 through the slope compensation component 784. For example, in response, the comparator 742 generates a comparison signal 743, which is received by the flip-flop component 754. In another example, the flip-flop component 754 also receives a clock signal 755 from the clock generator 756 and generates a modulation signal 757. In yet another example, the modulation signal 757 is received by the driver component 758, which in response outputs the drive signal 759 to the switch 4720.

According to one embodiment, for CCM, since $$I_{out} = \frac{1}{T_s} \times \int_0^{T_s} I_L(t)dt = \frac{1}{T_{on}} \times \int_0^{T_{on}} I_L(t)dt \quad \text{(Equation 37)}$$

then $I_{out} = \frac{V_{ref}}{R_s}$ (Equation 38)

where $I_{out}$ represents the lamp current 792 and $R_s$ is the resistance of the sensing resistor 4760. According to another embodiment, $R_s$ and $V_{ref}$ are all constants, so the constant lamp current 792 is achieved.

As discussed above and further emphasized here, FIG. 7 is merely an example, which should not unduly limit the scope of the claims. One of ordinary skill in the art would recognize many variations, alternatives, and modifications. For example, the leading-edge blanking component 750 is removed, and the signal 752 is received directly from the terminal 714. In another example, the capacitor 790 is located on the chip 710. In yet another example, a low-pass filter and/or a buffer are added to process the signal 783 before the signal 783 is received by the comparator 742. In yet another example, two resistors are further added to divide the processed signal 783 before the processed signal 783 is received by the comparator 742.

FIG. 8 is a simplified diagram for a LED lighting system according to yet another embodiment of the present invention. This diagram is merely an example, which should not unduly limit the scope of the claims. One of ordinary skill in the art would recognize many variations, alternatives, and modifications. The lighting system 800 includes a switch 4820, a diode 4830, an inductor 4840, a capacitor 4850, and a sensing resistor 4860. Additionally, the lighting system 800 also includes a comparator 842, a leading-edge blanking component 850, a flip-flop component 854, a clock generator 856, and a driver component 858. Moreover, the lighting system 800 also includes a transconductance amplifier 886, switches 880 and 882, and a capacitor 890.

For example, the switch 4820, the diode 4830, the inductor 4840, the capacitor 4850, and the sensing resistor 4860 are the same as the power switch 120, the diode 130, the inductor 140, the capacitor 150, and the sensing resistor 160, respectively. In another example, the comparator 842, the leading-edge blanking component 850, the flip-flop component 854, the clock generator 856, the driver component 858, the transconductance amplifier 886, and the switches 880 and 882 are located on a chip 810. In yet another example, the capacitor 890 is located off the chip 810. In yet another example, the chip 810 includes terminals 812, 814, 818, and 819.

As shown in FIG. 8, the lighting system 800 receives an input voltage 832 and provides a lamp current 892 (e.g., an output current) and a lamp voltage to one or more LEDs 4890. In one embodiment, a current that flows through the inductor 4840 is sensed by the resistor 4860. For example, the resistor 4860 generates, through the terminal 814 and with the leading-edge blanking component 850, a current sensing signal 852.

In another embodiment, the transconductance amplifier 886 receives the current sensing signal 852 (e.g., $V_{cs}$), and also receives a predetermined voltage signal 891 (e.g., $V_{ref}$) through the switch 880. For example, the switch 880 is controlled by a signal 885, which has been generated based on a drive signal 859. In another example, if the signal 885 is at the logic high level, the switch 880 is closed, and if the signal 885 is at the logic low level, the switch 880 is open. In yet another example, the switch 880 is closed during the on-time of the switch 4820, and is open during the off-time of the switch 4820.

In yet another embodiment, during the on-time of the switch 4820, the transconductance amplifier 886 compares the current sensing signal 852 (e.g., $V_{cs}$) and the predetermined voltage signal 891 (e.g., $V_{ref}$), and converts the difference between the current sensing signal 852 (e.g., $V_{cs}$) and the predetermined voltage signal 891 (e.g., $V_{ref}$) into a current 889. For example, the current 889 is proportional to the difference between the current sensing signal 852 (e.g., $V_{cs}$) and the predetermined voltage signal 891 (e.g., $V_{ref}$). In another example, during the on-time of the switch 4820, the current 889 charges the capacitor 890 if the predetermined voltage signal 891 (e.g., $V_{ref}$) is larger than the current sensing signal 852 (e.g., $V_{cs}$) in magnitude, and discharges the capacitor 890 if the predetermined voltage signal 891 (e.g., $V_{ref}$) is smaller than the current sensing signal 852 (e.g., $V_{cs}$) in magnitude.

In yet another embodiment, during the off-time of the switch 4820, the predetermined voltage signal 891 (e.g., $V_{ref}$) is shorted to the ground through the switch 882. For example, the switch 882 is controlled by a signal 845, which has been generated based on the drive signal 859. In another example, if the signal 845 is at the logic high level, the switch 882 is closed, and if the signal 845 is at the logic low level, the switch 882 is open. In yet another example, the switch 882 is closed during the off-time of the switch 4820, and is open during the on-time of the switch 4820.

As shown in FIG. 8, a signal 883 (e.g., $V_C$) is generated by the current 889 charging and/or discharging the capacitor 890. In one embodiment, the comparator 842 receives the signal 883 (e.g., $V_C$) and also receives the current sensing signal 852 through the slope compensation component 884. For example, in response, the comparator 842 generates a comparison signal 843, which is received by the flip-flop component 854. In another example, the flip-flop component 854 also receives a clock signal 855 from the clock generator 856 and generates a modulation signal 857. In yet another example, the modulation signal 857 is received by the driver component 858, which in response outputs the drive signal 859 to the switch 4820.

As discussed above and further emphasized here, FIG. 8 is merely an example, which should not unduly limit the scope of the claims. One of ordinary skill in the art would recognize many variations, alternatives, and modifications. For example, the leading-edge blanking component 850 is removed, and the signal 852 is received directly from the terminal 814. In another example, the capacitor 890 is located on the chip 810.

FIG. 9 is a simplified diagram for a LED lighting system according to yet another embodiment of the present invention. This diagram is merely an example, which should not unduly limit the scope of the claims. One of ordinary skill in the art would recognize many variations, alternatives, and modifications. The lighting system 900 includes a switch 4920, a diode 4930, an inductor 4940, capacitors 4950 and 4952, and a sensing resistor 4960. Additionally, the lighting system 900 also includes a comparator 942, a demagnetization detection component 944, a leading-edge blanking component 950, a flip-flop component 954, a pulse signal generator 956, and a driver component 958. Moreover, the lighting system 900 also includes a transconductance amplifier 986, switches 980 and 982, and a capacitor 990.

For example, the switch 4920, the diode 4930, the inductor 4940, the capacitor 4950, and the sensing resistor 4960 are the same as the power switch 120, the diode 130, the inductor 140, the capacitor 150, and the sensing resistor 160, respectively. In another example, the comparator 942, the demagnetization detection component 944, the leading-edge blanking component 950, the flip-flop component 954, the pulse signal generator 956, the driver component 958, the transconductance amplifier 986, and the switches 980 and 982 are located on a chip 910. In yet another example, the capacitor 990 is located off the chip 910. In yet another example, the chip 910 includes terminals 912, 914, 916, 918, and 919.

As shown in FIG. 9, the lighting system 900 receives an input voltage 932 and provides a lamp current 992 (e.g., an output current) and a lamp voltage to one or more LEDs 4990. In one embodiment, a current that flows through the inductor 4940 is sensed by the resistor 4960. For example, the resistor 4960 generates, through the terminal 914 and with the leading-edge blanking component 950, a current sensing signal 952.

In another embodiment, the transconductance amplifier 986 receives the current sensing signal 952 (e.g., $V_{cs}$), and also receives a predetermined voltage signal 991 (e.g., $V_{ref}$) through the switch 980. For example, the switch 980 is controlled by a signal 985, which has been generated based on a drive signal 959. In another example, if the signal 985 is at the logic high level, the switch 980 is closed, and if the signal 985 is at the logic low level, the switch 980 is open. In yet another example, the switch 980 is closed during the on-time of the switch 4920, and is open during the off-time of the switch 4920.

In yet another embodiment, during the on-time of the switch 4920, the transconductance amplifier 986 compares the current sensing signal 952 (e.g., $V_{cs}$) and the predetermined voltage signal 991 (e.g., $V_{ref}$), and converts the difference between the current sensing signal 952 (e.g., $V_{cs}$) and the predetermined voltage signal 991 (e.g., $V_{ref}$) into a current 989. For example, the current 989 is proportional to the difference between the current sensing signal 952 (e.g., $V_{cs}$) and the predetermined voltage signal 991 (e.g., $V_{ref}$). In another example, during the on-time of the switch 4920, the current 989 charges the capacitor 990 if the predetermined voltage signal 991 (e.g., $V_{ref}$) is larger than the current sensing signal 952 (e.g., $V_{cs}$) in magnitude, and discharges the capacitor 990 if the predetermined voltage signal 991 (e.g., $V_{ref}$) is smaller than the current sensing signal 952 (e.g., $V_{cs}$) in magnitude.

In yet another embodiment, during the off-time of the switch 4920, the predetermined voltage signal 991 (e.g., $V_{ref}$) is shorted to the ground through the switch 982. For example, the switch 982 is controlled by a signal 945, which has been generated based on the drive signal 959. In another example, if the signal 945 is at the logic high level, the switch 982 is closed, and if the signal 945 is at the logic low level, the switch 982 is open. In yet another example, the switch 982 is closed during the off-time of the switch 4920, and is open during the on-time of the switch 4920.

As shown in FIG. 9, a signal 983 (e.g., $V_C$) is generated by the current 989 charging and/or discharging the capacitor 990. In one embodiment, the comparator 942 receives the signal 983 (e.g., $V_C$) and also receives the current sensing signal 952. For example, in response, the comparator 942 generates a comparison signal 943, which is received by the flip-flop component 954. In another example, the flip-flop component 954 also receives a pulse signal 955 from the pulse signal generator 956 and generates a modulation signal 957. In yet another example, the modulation signal 957 is received by the driver component 958, which in response outputs the drive signal 959 to the switch 4920. In another embodiment, the pulse signal generator 956 receives a Demag signal 945 from the demagnetization detection component 944, and in response generates pulses of the pulse signal 955. For example, different pulses of the pulse signal 955 correspond to different switching cycles.

As discussed above and further emphasized here, FIG. 9 is merely an example, which should not unduly limit the scope of the claims. One of ordinary skill in the art would recognize many variations, alternatives, and modifications. For example, the leading-edge blanking component 950 is removed, and the signal 952 is received directly from the terminal 914. In another example, the capacitor 990 is located on the chip 910. In yet another example, a slope compensation component is added, through which the comparator 942 receives the current sensing signal 952.

FIG. 10 is a simplified diagram for a LED lighting system according to yet another embodiment of the present invention. This diagram is merely an example, which should not unduly limit the scope of the claims. One of ordinary skill in the art would recognize many variations, alternatives, and modifications. The lighting system 1000 includes a switch 5020, a diode 5030, an inductor 5040, capacitors 5050 and 5052, and a sensing resistor 5060. Additionally, the lighting system 1000 also includes a comparator 1042, a demagnetization detection component 1044, a leading-edge blanking component 1050, a flip-flop component 1054, a clock generator 1056, and a driver component 1058. Moreover, the lighting system 1000 also includes sampling-and-holding components 1062 and 1064, voltage-to-current converters 1060, 1066 and 1068, a switch 1080, and a capacitor 1090. Also, the lighting system 1000 further includes a signal amplifier 1086, a voltage-to-current converter 1088, a switch 1082, a multiplier component 1096, and resistors 1098 and 1099.

For example, the switch 5020, the diode 5030, the inductor 5040, the capacitor 5050, and the sensing resistor 5060 are the same as the power switch 120, the diode 130, the inductor 140, the capacitor 150, and the sensing resistor 160, respectively. In another example, the comparator 1042, the demagnetization detection component 1044, the leading-edge blanking component 1050, the flip-flop component 1054, the clock generator 1056, the driver component 1058, the sampling-and-holding components 1062 and 1064, the voltage-to-current converters 1060, 1066 and 1068, the switch 1080, the signal amplifier 1086, the voltage-to-current converter 1088, the switch 1082, and the multiplier component 1096 are located on a chip 1010. In yet another example, the capacitor 1090 is located off the chip 1010. In yet another example, the chip 1010 includes terminals 1012, 1014, 1016, 1017, 1018, and 1019.

According to one embodiment, in CCM, the next switching cycle starts before the demagnetization process is completed. For example, the actual length of the demagnetization process (e.g., $T_{demag}$) before the next switching cycle starts is limited to the off-time of the switch 5020 (e.g., $T_{off}$); hence $T_{off}$ can be represented by $T_{demag}$ in CCM. According to another embodiment, in DCM, the off-time of the switch 5020 (e.g., $T_{off}$) is much longer than the demagnetization period (e.g., $T_{demag}$). According to yet another embodiment, in CRM, the off-time of the switch 5020 (e.g., $T_{off}$) is slightly longer than the demagnetization period (e.g., $T_{demag}$).

As shown in FIG. 10, the lighting system 1000 receives an input voltage 1032 and provides a rectified voltage 1093 and a lamp current 1092 (e.g., an output current) to drive one or more LEDs 5090. In one embodiment, a current that flows through the inductor 5040 is sensed by the resistor 5060. For example, the resistor 5060 generates, through the terminal 1014 and with the leading-edge blanking component 1050, a current sensing signal 1052.

In another embodiment, the sampling-and-holding component 1062 receives at least a drive signal 1059 and a control signal 1061. For example, the control signal 1061 includes, for each switching cycle, a pulse that has a rising edge at the beginning of the on-time of the switch 5020 (e.g., at the rising edge of the drive signal 1059). In another example, during the pulse, the current sensing signal 1052 (e.g., $V_{cs}$) is sampled and held as a voltage signal 1063 (e.g., $V_{s2}$). In yet another example, after the falling edge of the pulse, the voltage signal 1063 remains constant (e.g., being equal to $V_{cs\_0}$) until the next pulse of the control signal 1061. In one embodiment, the pulse of the control signal 1061 is so narrow that $V_{cs\_0}$ equals approximately and thus represents the current sensing signal 1052 at the beginning of the on-time of the switch 5020.

In yet another embodiment, the sampling-and-holding component 1064 receives at least the drive signal 1059, which includes, for each switching cycle, a pulse that has a width corresponding to the on-time of the switch 5020 (e.g., $T_{on}$). For example, during the pulse of the drive signal 1059, the current sensing signal 1052 (e.g., $V_{cs}$) is sampled and held as a voltage signal 1065 (e.g., $V_{s3}$). In another example, after the falling edge of the pulse, the voltage signal 1065 remains constant (e.g., being equal to $V_{cs\_p}$) until the next pulse of the drive signal 1059.

As shown in FIG. 10, the voltage signals 1063 and 1065 are received by the voltage-to-current converters 1066 and 1068, which in response generate current signals 1067 and 1069, respectively, according to one embodiment. For example, the current signal 1067 is represented by $I_{s2}$, and the current signal 1069 is represented by $I_{s3}$. In another example, the sum of the current signals 1067 and 1069 forms a sinking current 1081 (e.g., $I_{sink2}$), which is used to discharge the capacitor 1090 if the switch 1080 is closed.

According to another embodiment, the switch 1080 is controlled by a Demag signal 1045, which is generated by the demagnetization detection component 1044. For example, if the Demag signal 1045 is at the logic high level, the switch 1080 is closed. In another example, the switch 1080 is closed during the demagnetization period and is open during the rest of the switching period. In yet another example, the sinking current 1081 discharges the capacitor 1090 during the demagnetization period (e.g., during $T_{demag}$).

Also, as shown in FIG. 10, the signal amplifier 1086 receives the current sensing signal 1052 (e.g., $V_{cs}$) and generates a voltage signal 1087 (e.g., $V_{s1}$) according to one embodiment. For example, the voltage signal 1087 (e.g., $V_{s1}$) equals two times the current sensing signal 1052 (e.g., $V_{cs}$) in magnitude. According to another embodiment, the voltage signal 1087 is received by the voltage-to-current converter 1088, which in response generates a sinking current 1089 (e.g., $I_{sink1}$). For example, the sinking current 1089 is used to discharge the capacitor 1090 if the switch 1082 is closed.

According to yet another embodiment, the switch 1082 is controlled by a signal 1085, which has been generated based on the signal 1059. For example, if the signal 1085 is at the logic high level, the switch 1082 is closed, and if the signal 1085 is at the logic low level, the switch 1082 is open. In another example, the switch 1082 is closed during the on-time of the switch 5020, and is open during the off-time of the switch 5020. In yet another example, the sinking current 1089 discharges the capacitor 1090 during the on-time of the switch 5020. According to yet another embodiment, the voltage-to-current converter 1060 receives a predetermined voltage signal 1091 (e.g., $V_{ref}$), and in response generates a charging current 1061 (e.g., $I_{ref}$). For example, the charging current 1061 charges the capacitor 1090 during the switching period (e.g., during $T_s$). According to yet another embodiment, the signal 1083 (e.g., $V_C$) is generated by the charging current 1061 (e.g., $I_{ref}$), the discharging current 1081 (e.g., $I_{sink2}$), and the discharging current 1089 (e.g., $I_{sink1}$) for the capacitor 1090. For example, the signal 1083 (e.g., $V_C$) decreases in magnitude during the demagnetization period (e.g., during $T_{demag}$), and increases during the rest of the switching cycle.

As shown in FIG. 10, the resistor 1098 receives the rectified voltage 1093, and together with the resistor 1099, generates a signal 1095. For example, the signal 1095 is received by the multiplier component 1096 through the terminal 1017. In another example, the multiplier component 1096 also receives the signal 1083 (e.g., $V_C$) and generates a control signal 1097 based on at least information associated with the signals 1095 and 1083.

In one embodiment, the comparator 1042 receives the control signal 1097, and also receives the current sensing signal 1052 through the slope compensation component 1084. For example, in response, the comparator 1042 generates a comparison signal 1043, which is received by the flip-flop component 1054. In another example, the flip-flop component 1054 also receives a clock signal 1055 from the clock generator 1056 and generates a modulation signal 1057. In yet another example, the modulation signal 1057 is received by the driver component 1058, which in response outputs the drive signal 1059 to the switch 5020 and the sampling-and-holding components 1062 and 1064. In another embodiment, for DCM, CCM and CRM, the lighting system 1000 has power factor that is equal to or larger than 0.9, such as being equal to 1. For example, the high power factor and precise control of constant lamp current 1092 are simultaneously achieved by the lighting system 1000.

In yet another embodiment, if, over a plurality of switching cycles, the charging and the discharging of the capacitor 1090 are equal, the lighting system 1000 reaches the equilibrium (e.g., the steady state), as follows:

$$\sum_{i=0}^{N} I_{ref} \times T_s(i) = \sum_{j=0}^{N} \frac{1}{2} \times I_{sink1\_p}(i) \times T_{on}(i) + I_{sink2}(i) \times T_{demag}(i) \qquad \text{(Equation 39)}$$

where i represents the $i^{th}$ switching cycle.

As discussed above and further emphasized here, FIG. 10 is merely an example, which should not unduly limit the scope of the claims. One of ordinary skill in the art would recognize many variations, alternatives, and modifications. For example, the leading-edge blanking component 1050 is removed, and the signal 1052 is received directly from the terminal 1014. In another example, the capacitor 1090 is located on the chip 1010. In yet another example, a low-pass filter and/or a buffer are added to process the signal 1083 before the signal 1083 is received by the multiplier component 1096. In yet another example, two resistors are further added to divide the processed signal 1083 before the processed signal 1083 is received by the multiplier component 1096.

In yet another example, for DCM and CRM, $V_{cs\_0}$ is equal to zero, so the sampling-and-holding component 1062 and the voltage-to-current converter 1066 are removed if the lighting system 1000 does not need to operate in DCM and CRM for constant lamp current 1092. In yet another example, for CRM, the clock generator 1056 is replaced by a pulse signal generator, which receives the Demag signal 1045 and in response generates pulses of a pulse signal 1055. In yet another example, the pulse signal 1055 is received by the flip-flop component 1054, and different pulses of the pulse signal 1055 correspond to different switching cycles.

FIG. 11 is a simplified diagram for a LED lighting system according to yet another embodiment of the present invention. This diagram is merely an example, which should not unduly limit the scope of the claims. One of ordinary skill in the art would recognize many variations, alternatives, and modifications. The lighting system 1100 includes a switch 5120, a diode 5130, an inductor 5140, capacitors 5150 and 5152, and a sensing resistor 5160. Additionally, the lighting system 1100 also includes a comparator 1142, a demagnetization detection component 1144, a leading-edge blanking component 1150, a flip-flop component 1154, a pulse signal generator 1156, and a driver component 1158. Moreover, the lighting system 1100 also includes a transconductance amplifier 1186, switches 1180 and 1182, a capacitor 1190, and a ramping signal generator 1199.

For example, the switch 5120, the diode 5130, the inductor 5140, the capacitor 5150, and the sensing resistor 5160 are the same as the power switch 120, the diode 130, the inductor 140, the capacitor 150, and the sensing resistor 160, respectively. In another example, the comparator 1142, the demagnetization detection component 1144, the leading-edge blanking component 1150, the flip-flop component 1154, the pulse signal generator 1156, the driver component 1158, the transconductance amplifier 1186, the switches 1180 and 1182, and the ramping signal generator 1199 are located on a chip 1110. In yet another example, the capacitor 1190 is located off the chip 1110. In yet another example, the chip 1110 includes terminals 1112, 1114, 1116, 1118, and 1119.

As shown in FIG. 11, the lighting system 1100 receives an input voltage 1132 and provides a lamp current 1192 (e.g., an output current) and a lamp voltage to one or more LEDs 5190. In one embodiment, a current that flows through the inductor 5140 is sensed by the resistor 5160. For example, the resistor 5160 generates, through the terminal 1114 and with the leading-edge blanking component 1150, a current sensing signal 1152.

In another embodiment, the transconductance amplifier 1186 receives the current sensing signal 1152 (e.g., $V_{cs}$), and also receives a predetermined voltage signal 1191 (e.g., $V_{ref}$) through the switch 1180. For example, the switch 1180 is controlled by a signal 1185, which has been generated based on a drive signal 1159. In another example, if the signal 1185 is at the logic high level, the switch 1180 is closed, and if the signal 1185 is at the logic low level, the switch 1180 is open. In yet another example, the switch 1180 is closed during the on-time of the switch 5120, and is open during the off-time of the switch 5120.

In yet another embodiment, during the on-time of the switch 5120, the transconductance amplifier 1186 compares the current sensing signal 1152 (e.g., $V_{cs}$) and the predetermined voltage signal 1191 (e.g., $V_{ref}$), and converts the difference between the current sensing signal 1152 (e.g., $V_{cs}$) and the predetermined voltage signal 1191 (e.g., $V_{ref}$) into a current 1189. For example, the current 1189 is proportional to the difference between the current sensing signal 1152 (e.g., $V_{cs}$) and the predetermined voltage signal 1191 (e.g., $V_{ref}$). In another example, during the on-time of the switch 5120, the current 1189 charges the capacitor 1190 if the predetermined voltage signal 1191 (e.g., $V_{ref}$) is larger than the current sensing signal 1152 (e.g., $V_{cs}$) in magnitude, and discharges the capacitor 1190 if the predetermined voltage signal 1191 (e.g., $V_{ref}$) is smaller than the current sensing signal 1152 (e.g., $V_{cs}$) in magnitude.

In yet another embodiment, during the off-time of the switch 5120, the predetermined voltage signal 1191 (e.g., $V_{ref}$) is shorted to the ground through the switch 1182. For example, the switch 1182 is controlled by a signal 1145, which has been generated based on the drive signal 1159. In another example, if the signal 1145 is at the logic high level, the switch 1182 is closed, and if the signal 1145 is at the logic low level, the switch 1182 is open. In yet another example, the switch 1182 is closed during the off-time of the switch 5120, and is open during the on-time of the switch 5120.

As shown in FIG. 11, a signal 1183 (e.g., $V_C$) is generated by the current 1189 charging and/or discharging the capacitor 1190. In one embodiment, the comparator 1142 receives the signal 1183 (e.g., $V_C$) and also receives a ramping signal 1193. For example, the ramping signal 1193 is generated by the ramping signal generator 1199 in response to a pulse signal 1155. In another example, in response, the comparator 1142 generates a comparison signal 1143, which is received by the flip-flop component 1154. In another example, the flip-flop component 1154 also receives the pulse signal 1155 from the pulse signal generator 1156 and generates a modulation signal 1157. In yet another example, the modulation signal 1157 is received by the driver component 1158, which in response outputs the drive signal 1159 to the switch 5120. In another embodiment, the pulse signal generator 1156 receives a Demag signal 1145 from the demagnetization detection component 1144, and in response generates pulses of the pulse signal 1155. For example, different pulses of the pulse signal 1155 correspond to different switching cycles.

As discussed above and further emphasized here, FIG. 11 is merely an example, which should not unduly limit the scope of the claims. One of ordinary skill in the art would recognize many variations, alternatives, and modifications. For example, the leading-edge blanking component 1150 is removed, and the signal 1152 is received directly from the terminal 1114. In another example, the capacitor 1190 is located on the chip 1110.

FIG. 12 is a simplified diagram for a LED lighting system according to yet another embodiment of the present invention. This diagram is merely an example, which should not unduly limit the scope of the claims. One of ordinary skill in the art would recognize many variations, alternatives, and modifications. The lighting system 1200 includes a switch 5220, a diode 5230, an inductor 5240, capacitors 5250 and 5252, and a sensing resistor 5260. Additionally, the lighting system 1200 also includes a comparator 1242, a demagnetization detection component 1244, a leading-edge blanking component 1250, a flip-flop component 1254, a pulse signal generator 1256, and a driver component 1258. Moreover, the lighting system 1200 also includes a transconductance amplifier 1286, switches 1280 and 1282, a capacitor 1290, a multiplier component 1296, and resistors 1298 and 1299.

For example, the switch 5220, the diode 5230, the inductor 5240, the capacitor 5250, and the sensing resistor 5260 are the same as the power switch 120, the diode 130, the inductor 140, the capacitor 150, and the sensing resistor 160, respectively. In another example, the comparator 1242, the demagnetization detection component 1244, the leading-edge blanking component 1250, the flip-flop component 1254, the pulse signal generator 1256, the driver component 1258, the transconductance amplifier 1286, the switches 1280 and 1282, and the multiplier component 1296 are located on a chip 1210. In yet another example, the capacitor 1290 is located off the chip 1210. In yet another example, the chip 1210 includes terminals 1212, 1214, 1216, 1217, 1218, and 1219.

As shown in FIG. 12, the lighting system 1200 receives an input voltage 1232 and provides a rectified voltage 1293 and a lamp current 1292 (e.g., an output current) to drive one or more LEDs 5290. In one embodiment, a current that flows through the inductor 5240 is sensed by the resistor 5260. For example, the resistor 5260 generates, through the terminal 1214 and with the leading-edge blanking component 1250, a current sensing signal 1252.

In another embodiment, the transconductance amplifier 1286 receives the current sensing signal 1252 (e.g., $V_{cs}$), and also receives a predetermined voltage signal 1291 (e.g., $V_{ref}$) through the switch 1280. For example, the switch 1280 is controlled by a signal 1285, which has been generated based on a drive signal 1259. In another example, if the signal 1285 is at the logic high level, the switch 1280 is closed, and if the signal 1285 is at the logic low level, the switch 1280 is open. In yet another example, the switch 1280 is closed during the on-time of the switch 5220, and is open during the off-time of the switch 5220.

In yet another embodiment, during the on-time of the switch 5220, the transconductance amplifier 1286 compares the current sensing signal 1252 (e.g., $V_{cs}$) and the predetermined voltage signal 1291 (e.g., $V_{ref}$), and converts the difference between the current sensing signal 1252 (e.g., $V_{cs}$) and the predetermined voltage signal 1291 (e.g., $V_{ref}$) into a current 1289. For example, the current 1289 is proportional to the difference between the current sensing signal 1252 (e.g., $V_{cs}$) and the predetermined voltage signal 1291 (e.g., $V_{ref}$). In another example, during the on-time of the switch 5220, the current 1289 charges the capacitor 1290 if the predetermined voltage signal 1291 (e.g., $V_{ref}$) is larger than the current sensing signal 1252 (e.g., $V_{cs}$) in magnitude, and discharges the capacitor 1290 if the predetermined voltage signal 1291 (e.g., $V_{ref}$) is smaller than the current sensing signal 1252 (e.g., $V_{cs}$) in magnitude.

In yet another embodiment, during the off-time of the switch 5220, the predetermined voltage signal 1291 (e.g., $V_{ref}$) is shorted to the ground through the switch 1282. For example, the switch 1282 is controlled by a signal 1245, which has been generated based on the drive signal 1259. In another example, if the signal 1245 is at the logic high level, the switch 1282 is closed, and if the signal 1245 is at the logic low level, the switch 1282 is open. In yet another example, the switch 1282 is closed during the off-time of the switch 5220, and is open during the on-time of the switch 5220.

As shown in FIG. 12, a signal 1283 (e.g., $V_C$) is generated by the current 1289 charging and/or discharging the capacitor 1290. In one embodiment, the resistor 1298 receives the rectified voltage 1293, and together with the resistor 1299, generates a signal 1295. For example, the signal 1295 is received by the multiplier component 1296 through the terminal 1217. In another example, the multiplier component 1296 also receives the signal 1283 (e.g., $V_C$) and generates a control signal 1297 based on at least information associated with the signals 1295 and 1283.

In another embodiment, the comparator 1242 receives the control signal 1297, and also receives the current sensing signal 1252. For example, in response, the comparator 1242 generates a comparison signal 1243, which is received by the flip-flop component 1254. In another example, the flip-flop component 1254 also receives a pulse signal 1255 from the pulse signal generator 1256 and generates a modulation signal 1257. In yet another example, the modulation signal 1257 is received by the driver component 1258, which in response outputs the drive signal 1259 to the switch 5220. In yet another embodiment, the pulse signal generator 1256 receives a Demag signal 1245 from the demagnetization detection component 1244, and in response generates pulses of the pulse signal 1255. For example, different pulses of the pulse signal 1255 correspond to different switching cycles.

As discussed above and further emphasized here, FIG. 12 is merely an example, which should not unduly limit the scope of the claims. One of ordinary skill in the art would recognize many variations, alternatives, and modifications. For example, the leading-edge blanking component 1250 is removed, and the signal 1252 is received directly from the terminal 1214. In another example, the capacitor 1290 is located on the chip 1210. In yet another example, a slope compensation component is added, through which the comparator 1242 receives the current sensing signal 1252.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined. In yet another example, various embodiments and/or examples of the present invention are combined so that a lighting system can provide constant lamp current in various operation modes, such as in all of the DCM mode, the CCM mode and the CRM mode under certain conditions (e.g., with different input voltages).

The present invention has a wide range of applications. Certain embodiments of the present invention can be used to drive one or more light emitting diodes with high power factor and precise control of constant lamp current.

According to another embodiment, a system (e.g., as implemented according to FIG. 3) for providing at least an output current to one or more light emitting diodes includes a control component (e.g., the component 380) configured to receive at least a demagnetization signal (e.g., the signal 383), a sensed signal (e.g., the signal 314) and a reference signal (e.g., the signal 389) and to generate a control signal (e.g., the signal 391) based on at least information associated with the demagnetization signal, the sensed signal and the reference signal, and a logic and driving component (e.g., the components 362, 394 and 396) configured to receive at least the control signal (e.g., the signal 391) and output a drive signal (e.g., the signal 312) to a switch (e.g., the component 320) based on at least information associated with the control signal (e.g., the signal 391). The switch (e.g., the component 320) is connected to a first diode terminal of a diode (e.g., the component 330) and a first inductor terminal of an inductor (e.g., the component 340). The diode further includes a second diode terminal, and the inductor further includes a second inductor terminal. The second diode terminal and the second inductor terminal are configured to provide at least the output current to the one or more light emitting diodes. The control signal (e.g., the signal 391) is configured to regulate the output current at a constant magnitude.

According to yet another embodiment, a method (e.g., as implemented according to FIG. 3) for providing at least an output current to one or more light emitting diodes includes receiving at least a demagnetization signal (e.g., the signal 383), a sensed signal (e.g., the signal 314) and a reference signal (e.g., the signal 389), processing information associated with the demagnetization signal, the sensed signal and the reference signal, and generating a control signal (e.g., the signal 391) based on at least information associated with the demagnetization signal, the sensed signal and the reference signal. Additionally, the method includes receiving at least the control signal (e.g., the signal 391), processing information associated with the control signal, and outputting a drive signal (e.g., the signal 312) to a switch (e.g., the component 320) connected to a first diode terminal of a diode (e.g., the component 330) and a first inductor terminal of an inductor (e.g., the component 340). The diode further includes a second diode terminal, and the inductor further includes a second inductor terminal. The second diode terminal and the second inductor terminal are configured to provide at least the output current to the one or more light emitting diodes. Moreover, the method includes regulating the output current at a predetermined magnitude based on at least information associated with the control signal (e.g., the signal 391).

According to yet another embodiment, a system (e.g., as implemented according to FIG. 5) for providing at least an output current to one or more light emitting diodes includes a first signal processing component (e.g., the component 520) configured to receive at least a sensed signal (e.g., the signal 552) and generate a first signal (e.g., the signal 521). The sensed signal is associated with an inductor current flowing through an inductor coupled to a switch. Additionally, the system includes a second signal processing component (e.g., the component 522) configured to generate a second signal (e.g., the signal 523), an integrator component (e.g., the components 530 and 540) configured to receive the first signal and the second signal and generate a third signal (e.g., the signal 531), and a comparator (e.g., the component 542) configured to process information associated with the third signal and the sensed signal and generate a comparison signal (e.g., the signal 543) based on at least information associated with the third signal and the sensed signal. Moreover, the system includes a signal generator (e.g., the component 554) configured to receive at least the comparison signal and generate a modulation signal (e.g., the signal 557), and a gate driver (e.g., the component 558) configured to receive the modulation signal (e.g., the signal 557) and output a drive signal to the switch. The drive signal is associated with at least one or more switching periods, and each of the one or more switching periods includes at least an on-time period for the switch and a demagnetization period for a demagnetization process. For each of the one or more switching periods, the first signal represents a multiplication result of a first sum of the on-time period and the demagnetization period and a second sum of a first current magnitude and a second current magnitude, and the second signal represents the switching period multiplied by a predetermined current magnitude. The first current magnitude represents the inductor current at the beginning of the on-time period, and the second current magnitude represents the inductor current at the end of the on-time period. The integrator component is further configured to integrate period-by-period differences between the first signal and the second signal for a plurality of switching periods, and the third signal (e.g., the signal 531) represents the integrated period-by-period differences. The integrated period-by-period differences are smaller than a predetermined threshold in magnitude.

According to yet another embodiment, a method (e.g., as implemented according to FIG. 5) for providing at least an output current to one or more light emitting diodes includes receiving at least a sensed signal. The sensed signal is associated with an inductor current flowing through an inductor coupled to a switch. Additionally, the method includes processing information associated with the sensed signal, generating a first signal based on at least information associated with the sensed signal, generating a second signal, receiving the first signal and the second signal, processing information associated with the first signal and the second signal, and generating a third signal based on at least information associated with the first signal and the second signal. Moreover, the method includes processing information associated with the third signal and the sensed signal, generating a comparison signal based on at least information associated with the third signal and the sensed signal, receiving at least the comparison signal, generating a modulation signal based on at least information associated with the comparison signal, receiving the modulation signal, and outputting a drive signal based on at least information associated with the modulation signal. The drive signal is associated with at least one or more switching periods, and each of the one or more switching periods includes at least an on-time period and a demagnetization period. For each of the one or more switching periods, the first signal represents a multiplication result of a first sum of the on-time period and the demagnetization period and a second sum of a first current magnitude and a second current magnitude, and the second signal represents the switching period multiplied by a predetermined current magnitude. The first current magnitude represents the inductor current at the beginning of the on-time period, and the second current magnitude represents the inductor current at the end of the on-time period. The process for processing information associated with the first signal and the second signal includes integrating period-by-period differences between the first signal and the second signal for a plurality of switching periods, and the third signal represents the integrated period-by-period differences. The integrated period-by-period differences are smaller than a predetermined threshold in magnitude.

According to yet another embodiment, a system (e.g., as implemented according to FIG. 5) for providing at least an output current to one or more light emitting diodes includes a first signal processing component (e.g., the component 520) configured to receive at least a sensed signal (e.g., the signal 552) and generate a first signal (e.g., the signal 521). The sensed signal is associated with an inductor current flowing through an inductor coupled to a switch. Additionally, the system includes a second signal processing component (e.g., the component 522) configured to generate a second signal (e.g., the signal 523), an integrator component (e.g., the components 530 and 540) configured to receive the first signal and the second signal and generate a third signal (e.g., the signal 531), and a comparator (e.g., the component 542) configured to process information associated with the third signal and the sensed signal and generate a comparison signal (e.g., the signal 543) based on at least information associated with the third signal and the sensed signal. Moreover, the system includes a signal generator (e.g., the component 554) configured to receive at least the comparison signal and generate a modulation signal (e.g., the signal 557), and a gate driver (e.g., the component 558) configured to receive the modulation signal (e.g., the signal 557) and output a drive signal to the switch. The drive signal is associated with at least one or more switching periods, and each of the one or more switching periods includes at least an on-time period for the switch and a demagnetization period for a demagnetization process. For each of the one or more switching periods, the first signal represents a sum of a first multiplication result and a second multiplication result, and the second signal represents the switching period multiplied by a predetermined current magnitude. The first multiplication result is equal to the on-time period multiplied by a sum of a first current magnitude and a second current magnitude. The first current magnitude represents the inductor current at the beginning of the on-time period, and the second current magnitude represents the inductor current at the end of the on-time period. The second multiplication result is equal to two multiplied by the demagnetization period and further multiplied by a third current magnitude, and the third current magnitude represents the inductor current at the middle of the on-time period. The integrator component is further configured to integrate period-by-period differences between the first signal and the second signal for a plurality of switching periods, and the third signal (e.g., the signal 531) represents the integrated period-by-period differences. The integrated period-by-period differences are smaller than a predetermined threshold in magnitude.

According to yet another embodiment, a method (e.g., as implemented according to FIG. 5) for providing at least an output current to one or more light emitting diodes includes receiving at least a sensed signal. The sensed signal is associated with an inductor current flowing through an inductor coupled to a switch. Additionally, the method includes processing information associated with the sensed signal, generating a first signal based on at least information associated with the sensed signal, generating a second signal, receiving the first signal and the second signal, processing information associated with the first signal and the second signal, and generating a third signal based on at least information associated with the first signal and the second signal. Moreover, the method includes processing information associated with the third signal and the sensed signal, generating a comparison signal based on at least information associated with the third signal and the sensed signal, receiving at least the comparison signal, and generating a modulation signal based on at least information associated with the comparison signal. Also, the method includes receiving the modulation signal, and outputting a drive signal based on at least information associated with the modulation signal. The drive signal is associated with at least one or more switching periods, and each of the one or more switching periods includes at least an on-time period and a demagnetization period. For each of the one or more switching periods, the first signal represents a sum of a first multiplication result and a second multiplication result, and the second signal represents the switching period multiplied by a predetermined current magnitude. The first multiplication result is equal to the on-time period multiplied by a sum of a first current magnitude and a second current magnitude. The first current magnitude represents the inductor current at the beginning of the on-time period, and the second current magnitude represents the inductor current at the end of the on-time period. The second multiplication result is equal to two multiplied by the demagnetization period and further multiplied by a third current magnitude, and the third current magnitude represents the inductor current at the middle of the on-time period. The process for processing information associated with the first signal and the second signal includes integrating period-by-period differences between the first signal and the second signal for a plurality of switching periods, and the third signal represents the integrated period-by-period differences. The integrated period-by-period differences are smaller than a predetermined threshold in magnitude.

According to yet another embodiment, a system (e.g., as implemented according to FIG. 6) for providing at least an output current to one or more light emitting diodes includes a first sampling-and-holding and voltage-to-current-conversion component (e.g., the components 662 and 666) configured to receive at least a sensed signal and generate a first current signal (e.g., the signal 667). The sensed signal is associated with an inductor current flowing through an inductor coupled to a first switch. Additionally, the system includes a second sampling-and-holding and voltage-to-current-conversion component (e.g., the components 664 and 668) configured to receive at least the sensed signal and generate a second current signal (e.g., the signal 669), and a signal-amplification and voltage-to-current-conversion component (e.g., the components 686 and 688) configured to receive at least the sensed signal and generate a third current signal (e.g., the signal 689). Moreover, the system includes a current-signal generator configured to generate a fourth current signal (e.g., the signal 661), and a capacitor coupled to the current-signal generator, coupled through a second switch to the first sampling-and-holding and voltage-to-current-conversion component and the second sampling-and-holding and voltage-to-current-conversion component, and coupled through a third switch to the signal-amplification and voltage-to-current-conversion component. The capacitor is configured to generate a voltage signal. Also, the system includes a comparator (e.g., the component 642) configured to process information associated with the voltage signal (e.g., the signal 683) and the sensed signal (e.g., the signal 652) and generate a comparison signal (e.g., the signal 643) based on at least information associated with the voltage signal and the sensed signal. Additionally, the system includes a modulation-signal generator (e.g., the component 654) configured to receive at least the comparison signal and generate a modulation signal (e.g., the signal 657), and a gate driver configured to receive the modulation signal and output a drive signal to the first switch. The drive signal is associated with at least one or more switching periods, and each of the one or more switching periods includes at least an on-time period for the first switch and a demagnetization period for a demagnetization process. The first current signal represents the inductor current at the beginning of the on-time period, the second current signal represents the inductor current at the end of the on-time period, and the third current signal represents the inductor current. For each of the one or more switching periods, the first current signal and the second current signal are configured to discharge or charge the capacitor during only the demagnetization period, the third current signal is configured to discharge or charge the capacitor during only the on-time period, and the fourth current signal is configured to charge or discharge the capacitor during the switching period.

According to yet another embodiment, a method (e.g., as implemented according to FIG. 6) for providing at least an output current to one or more light emitting diodes includes receiving at least a sensed signal. The sensed signal is associated with an inductor current flowing through an inductor coupled to a switch, processing information associated with the sensed signal, and generating a first current signal, a second current signal, and a third current signal based on at least information associated with the sensed signal. Additionally, the method includes generating a fourth current signal, processing information associated with the first current signal, the second current signal, the third current signal, and the fourth current signal, and generating a voltage signal, by at least a capacitor, based on at least information associated with the first current signal, the second current signal, the third current signal, and the fourth current signal. Moreover, the method includes processing information associated with the voltage signal and the sensed signal, generating a comparison signal based on at least information associated with the voltage signal and the sensed signal, receiving at least the comparison signal, and generating a modulation signal based on at least information associated with the comparison signal. Also, the method includes receiving the modulation signal, and outputting a drive signal based on at least information associated with the modulation signal. The drive signal is associated with at least one or more switching periods, and each of the one or more switching periods includes at least an on-time period and a demagnetization period. The first current signal represents the inductor current at the beginning of the on-time period, the second current signal represents the inductor current at the end of the on-time period, and the third current signal represents the inductor current. For each of the one or more switching periods, the process for processing information associated with the first current signal, the second current signal, the third current signal, and the fourth current signal includes discharging or charging the capacitor with the first current signal and the second current signal during only the demagnetization period, discharging or charging the capacitor with the third current signal during only the on-time period, and charging or discharging the capacitor with the fourth current signal during the switching period.

According to yet another embodiment, a system (e.g., as implemented according to FIG. 7) for providing at least an output current to one or more light emitting diodes includes a signal-amplification and voltage-to-current-conversion component (e.g., the components 786 and 788) configured to receive at least a sensed signal (e.g., the signal 752) and generate a first current signal (e.g., the signal 789). The sensed signal is associated with an inductor current flowing through an inductor coupled to a first switch. Additionally, the system includes a current-signal generator configured to generate a second current signal (e.g., the signal 761), and a capacitor coupled to the current-signal generator, and coupled through a second switch to the signal-amplification and voltage-to-current-conversion component. The capacitor is configured to generate a voltage signal. Moreover, the system includes a comparator configured to process information associated with the voltage signal and the sensed signal and generate a comparison signal based on at least information associated with the voltage signal and the sensed signal, a modulation-signal generator (e.g., the component 754) configured to receive at least the comparison signal and generate a modulation signal (e.g., the signal 757), and a gate driver configured to receive the modulation signal and output a drive signal to the first switch. The drive signal is associated with at least one or more switching periods, and the first current signal represents the inductor current. Each of the one or more switching periods includes at least an on-time period for the first switch. For each of the one or more switching periods, the first current signal is configured to discharge or charge the capacitor during only the on-time period, and the second current signal is configured to charge or discharge the capacitor during only the on-time period.

According to yet another embodiment, a method (e.g., as implemented according to FIG. 7) for providing at least an output current to one or more light emitting diodes includes receiving at least a sensed signal. The sensed signal is associated with an inductor current flowing through an inductor coupled to a switch. Additionally, the method includes processing information associated with the sensed signal, generating a first current signal based on at least information associated with the sensed signal, generating a second current signal, processing information associated with the first current signal and the second current signal, and generating a voltage signal, by at least a capacitor, based on at least information associated with the first current signal and the second current signal. Moreover, the method includes processing information associated with the voltage signal and the sensed signal, generating a comparison signal (e.g., the signal 743) based on at least information associated with the voltage signal and the sensed signal, receiving at least the comparison signal, generating a modulation signal based on at least information associated with the comparison signal, receiving the modulation signal, and outputting a drive signal based on at least information associated with the modulation signal. The drive signal is associated with at least one or more switching periods, and the first current signal represents the inductor current. Each of the one or more switching periods includes at least an on-time period. For each of the one or more switching periods, the process for processing information associated with the first current signal and the second current signal includes discharging or charging the capacitor with the first current signal during only the on-time period, and charging or discharging the capacitor with the second current signal during only the on-time period.

According to yet another embodiment, a system (e.g., as implemented according to FIG. 8 and/or FIG. 9) for providing at least an output current to one or more light emitting diodes includes a transconductance amplifier (e.g., the component 886 and/or the component 986) configured to receive a sensed signal and also receive a predetermined voltage signal (e.g., the signal 891 and/or the signal 991) through a first switch (e.g., the component 880 and/or the component 980). The sensed signal is associated with an inductor current flowing through an inductor coupled to a second switch (e.g., the component 4820 and/or the component 4920), and the transconductance amplifier is further configured to generate a current signal (e.g., the signal 889 and/or the signal 989). Additionally, the system includes a capacitor coupled to the transconductance amplifier and configured to generate a voltage signal (e.g., the signal 883 and/or the signal 983), and a comparator configured to process information associated with the voltage signal and the sensed signal and generate a comparison signal (e.g., the signal 843 and/or the signal 943) based on at least information associated with the voltage signal and the sensed signal. Moreover, the system includes a modulation-signal generator (e.g., the component 854 and/or the component 954) configured to receive at least the comparison signal and generate a modulation signal (e.g., the signal 857 and/or the signal 957), and a gate driver configured to receive the modulation signal and output a drive signal to the second switch. The drive signal is associated with at least one or more switching periods, and each of the one or more switching periods includes at least an on-time period for the second switch. The transconductance amplifier (e.g., the component 886 and/or the component 986) is further configured to, for each of the one or more switching periods, receive at least a predetermined voltage signal only during the on-time period. The current signal (e.g., the signal 889 and/or the signal 989) is configured to charge or discharge the capacitor.

According to yet another embodiment, a method (e.g., as implemented according to FIG. 8 and/or FIG. 9) for providing at least an output current to one or more light emitting diodes includes receiving at least a sensed signal. The sensed signal is associated with an inductor current flowing through an inductor coupled to a switch. Additionally, the method includes processing information associated with the sensed signal and a predetermined voltage signal (e.g., the signal 891 and/or the signal 991), generating a current signal based on at least information associated with the sensed signal and the predetermined voltage signal, and processing information associated with the current signal. Moreover, the method includes generating a voltage signal, by at least a capacitor, based on at least information associated with the current signal, processing information associated with the voltage signal and the sensed signal, and generating a comparison signal based on at least information associated with the voltage signal and the sensed signal. Also, the method includes receiving at least the comparison signal, generating a modulation signal based on at least information associated with the comparison signal, receiving the modulation signal, and outputting a drive signal based on at least information associated with the modulation signal. The drive signal is associated with at least one or more switching periods, and each of the one or more switching periods includes at least an on-time period. The process for receiving at least a sensed signal includes, for each of the one or more switching periods, receiving at least the predetermined voltage signal during only the on-time period. Also, the process for processing information associated with the current signal includes charging or discharging the capacitor with the current signal (e.g., the signal 889 and/or the signal 989).

According to yet another embodiment, a system (e.g., as implemented according to FIG. 10) for providing at least an output current to one or more light emitting diodes includes a first sampling-and-holding and voltage-to-current-conversion component (e.g., the components 1062 and 1066) configured to receive at least a sensed signal and generate a first current signal (e.g., the signal 1067). The sensed signal is associated with an inductor current flowing through an inductor coupled to a first switch. Additionally, the system includes a second sampling-and-holding and voltage-to-current-conversion component (e.g., the components 1064 and 1068) configured to receive at least the sensed signal and generate a second current signal (e.g., the signal 1069), and a signal-amplification and voltage-to-current-conversion component (e.g., the components 1086 and 1088) configured to receive at least the sensed signal and generate a third current signal (e.g., the signal 1089), a current-signal generator configured to generate a fourth current signal (e.g., the signal 1061), and a capacitor coupled to the current-signal generator, coupled through a second switch to the first sampling-and-holding and voltage-to-current-conversion component and the second sampling-and-holding and voltage-to-current-conversion component, and coupled through a third switch to the signal-amplification and voltage-to-current-conversion component, the capacitor being configured to generate a first voltage signal (e.g., the signal 1083). Moreover, the system includes a multiplier component (e.g., the component 1096) configured to process information associated with the first voltage signal (e.g., the signal 1083) and a second voltage signal (e.g., the signal 1093) and generate a multiplication signal based on at least information associated with the first voltage signal and the second voltage signal. Also, the system includes a comparator (e.g., the component 1042) configured to receive the multiplication signal and the sensed signal and generate a comparison signal (e.g., the signal 1043) based on at least information associated with the multiplication signal and the sensed signal, a modulation-signal generator (e.g., the component 1054) configured to receive at least the comparison signal and generate a modulation signal (e.g., the signal 1057), and a gate driver configured to receive the modulation signal and output a drive signal to the first switch. The drive signal is associated with at least a plurality of switching periods, and each of the one or more switching periods includes at least an on-time period for the first switch and a demagnetization period for a demagnetization process. The first current signal represents the inductor current at the beginning of the on-time period, the second current signal represents the inductor current at the end of the on-time period, and the third current signal represents the inductor current. For the plurality of switching periods, the first current signal and the second current signal are configured to discharge or charge the capacitor during only the demagnetization period, the third current signal is configured to discharge or charge the capacitor during only the on-time period, and the fourth current signal is configured to charge or discharge the capacitor during the switching period.

According to yet another embodiment, a method (e.g., as implemented according to FIG. 10) for providing at least an output current to one or more light emitting diodes includes receiving at least a sensed signal. The sensed signal is associated with an inductor current flowing through an inductor coupled to a switch. Additionally, the method includes processing information associated with the sensed signal, and generating a first current signal, a second current signal, and a third current signal based on at least information associated with the sensed signal. Moreover, the method includes generating a fourth current signal, processing information associated with the first current signal, the second current signal, the third current signal, and the fourth current signal, and generating a first voltage signal, by at least a capacitor, based on at least information associated with the first current signal, the second current signal, the third current signal, and the fourth current signal. Also, the method includes processing information associated with the first voltage signal and a second voltage signal, generating a multiplication signal based on at least information associated with the first voltage signal and the second voltage signal, receiving the multiplication signal and the sensed signal, and generating a comparison signal based on at least information associated with the multiplication signal and the sensed signal. Additionally, the method includes receiving at least the comparison signal, generating a modulation signal based on at least information associated with the comparison signal, receiving the modulation signal, and outputting a drive signal based on at least information associated with the modulation signal. The drive signal is associated with at least a plurality of switching periods, and each of the plurality of switching periods includes at least an on-time period and a demagnetization period. The first current signal represents the inductor current at the beginning of the on-time period, the second current signal represents the inductor current at the end of the on-time period, and the third current signal represents the inductor current. For each of the plurality of switching periods, the process for processing information associated with the first current signal, the second current signal, the third current signal, and the fourth current signal includes discharging or charging the capacitor with the first current signal and the second current signal during only the demagnetization period, discharging or charging the capacitor with the third current signal during only the on-time period, and charging or discharging the capacitor with the fourth current signal during the switching period.

According to yet another embodiment, a system (e.g., as implemented according to FIG. 11) for providing at least an output current to one or more light emitting diodes includes a transconductance amplifier (e.g., the component 1186) configured to receive a sensed signal and also receive a predetermined voltage signal (e.g., the signal 1191) through a first switch (e.g., the component 1180). The sensed signal is associated with an inductor current flowing through an inductor coupled to a second switch (e.g., the component 5120), and the transconductance amplifier (e.g., the component 1186) is further configured to generate a current signal (e.g., the signal 1189). Additionally, the system includes a capacitor (e.g., the component 1190) coupled to the transconductance amplifier and configured to generate a voltage signal (e.g., the signal 1183), and a comparator configured to process information associated with the voltage signal (e.g., the signal 1183) and a ramping signal (e.g., the signal 1193) and generate a comparison signal (e.g., the signal 1143) based on at least information associated with the voltage signal and the ramping signal. Moreover, the system includes a modulation-signal generator (e.g., the component 1154) configured to receive at least the comparison signal and generate a modulation signal (e.g., the signal 1157), and a gate driver configured to receive the modulation signal and output a drive signal to the second switch. The drive signal is associated with at least one or more switching periods, each of the one or more switching periods including at least an on-time period for the second switch. The transconductance amplifier (e.g., the component 1186) is further configured to, for each of the one or more switching periods, receive at least a predetermined voltage signal only during the on-time period. The current signal (e.g., the signal 1189) is configured to charge or discharge the capacitor.

According to yet another embodiment, a method (e.g., as implemented according to FIG. 11) for providing at least an output current to one or more light emitting diodes includes receiving at least a sensed signal. The sensed signal is associated with an inductor current flowing through an inductor coupled to a switch. Additionally, the method includes processing information associated with the sensed signal and a predetermined voltage signal (e.g., the signal 1191), generating a current signal based on at least information associated with the sensed signal and the predetermined voltage signal, processing information associated with the current signal, and generating a voltage signal, by at least a capacitor, based on at least information associated with the current signal. Moreover, the method includes processing information associated with the voltage signal and a ramping signal (e.g., the signal 1193), generating a comparison signal (e.g., the signal 1143) based on at least information associated with the voltage signal and the ramping signal, receiving at least the comparison signal, and generating a modulation signal based on at least information associated with the comparison signal. Also, the method includes receiving the modulation signal and outputting a drive signal based on at least information associated with the modulation signal. The drive signal is associated with at least one or more switching periods, and each of the one or more switching periods includes at least an on-time period. The process for receiving at least a sensed signal includes, for each of the one or more switching periods, receiving at least a predetermined voltage signal only during the on-time period, and the process for processing information associated with the current signal includes charging or discharging the capacitor with the current signal (e.g., the signal 1189).

According to yet another embodiment, a system (e.g., as implemented according to FIG. 12) for providing at least an output current to one or more light emitting diodes includes a transconductance amplifier (e.g., the component 1286) configured to receive a sensed signal and also receive a predetermined voltage signal (e.g., the signal 1291) through a first switch (e.g., the component 1280). The sensed signal is associated with an inductor current flowing through an inductor coupled to a second switch, and the transconductance amplifier (e.g., the component 1286) is further configured to generate a current signal (e.g., the signal 1289). Additionally, the system includes a capacitor coupled to the transconductance amplifier and configured to generate a first voltage signal (e.g., the signal 1283), and a multiplier component (e.g., the component 1296) configured to process information associated with the first voltage signal and a second voltage signal and generate a multiplication signal based on at least information associated with the first voltage signal and the second voltage signal. Moreover, the system includes a comparator (e.g., the component 1242) configured to receive the multiplication signal and the sensed signal and generate a comparison signal based on at least information associated with the multiplication signal and the sensed signal, a modulation-signal generator (e.g., the component 1254) configured to receive at least the comparison signal and generate a modulation signal (e.g., the signal 1257), and a gate driver configured to receive the modulation signal and output a drive signal to the second switch.

The drive signal is associated with at least one or more switching periods, each of the one or more switching periods including at least an on-time period for the second switch. The transconductance amplifier (e.g., the component 1286) is further configured to, for each of the one or more switching periods, receive at least a predetermined voltage signal during only the on-time period. The current signal (e.g., the signal 1289) is configured to charge or discharge the capacitor.

According to yet another embodiment, a method (e.g., as implemented according to FIG. 12) for providing at least an output current to one or more light emitting diodes includes receiving at least a sensed signal. The sensed signal is associated with an inductor current flowing through an inductor coupled to a switch. Additionally, the method includes processing information associated with the sensed signal and a predetermined voltage signal (e.g., the signal 1291), generating a current signal based on at least information associated with the sensed signal and the predetermined voltage signal, processing information associated with the current signal, and generating a first voltage signal (e.g., the signal 1283), by at least a capacitor, based on at least information associated with the current signal. Moreover, the method includes processing information associated with the first voltage signal and a second voltage signal (e.g., the signal 1293), generating a multiplication signal based on at least information associated with the first voltage signal and the second voltage signal, receiving the multiplication signal and the sensed signal, and generating a comparison signal based on at least information associated with the multiplication signal and the sensed signal. Also, the method includes receiving at least the comparison signal, generating a modulation signal based on at least information associated with the comparison signal, receiving the modulation signal, and outputting a drive signal based on at least information associated with the modulation signal. The drive signal is associated with at least one or more switching periods, and each of the one or more switching periods includes at least an on-time period. The process for receiving at least a sensed signal includes, for each of the one or more switching periods, receiving at least a predetermined voltage signal during only the on-time period, and the process for processing information associated with the current signal includes charging or discharging the capacitor with the current signal (e.g., the signal 1289).

According to yet another embodiment, a system (e.g., as implemented according to FIG. 5) for providing at least an output current to one or more light emitting diodes includes a first signal processing component configured to receive at least a sensed signal and generate a first signal. The sensed signal is associated with an inductor current flowing through an inductor coupled to a switch. Additionally, the system includes a second signal processing component configured to generate a second signal, an integrator component configured to receive the first signal and the second signal and generate a third signal, a comparator configured to process information associated with the third signal and the sensed signal and generate a comparison signal based on at least information associated with the third signal and the sensed signal. Moreover, the system includes a signal generator configured to receive at least the comparison signal and generate a modulation signal, and a gate driver configured to receive the modulation signal and output a drive signal to the switch. The drive signal is associated with at least one or more switching periods, and each of the one or more switching periods includes at least an on-time period for the switch and a demagnetization period for a demagnetization process. The first signal processing component is further configured to, for each of the one or more switching periods, sample the sensed signal at the middle of the on-time period, hold the sampled sensed signal representing the inductor current at the middle of the on-time period, and generate the first signal representing a sum of a first multiplication result and a second multiplication result based on at least information associated with the held and sampled sensed signal. For each of the one or more switching periods, the second signal represents the switching period multiplied by a predetermined current magnitude. The integrator component is further configured to integrate period-by-period differences between the first signal and the second signal for a plurality of switching periods, and the third signal represents the integrated period-by-period differences. The integrated period-by-period differences are smaller than a predetermined threshold in magnitude.

According to yet another embodiment, a method (e.g., as implemented according to FIG. 5) for providing at least an output current to one or more light emitting diodes includes receiving at least a sensed signal. The sensed signal is associated with an inductor current flowing through an inductor coupled to a switch. Additionally, the method includes processing information associated with the sensed signal, generating a first signal based on at least information associated with the sensed signal, generating a second signal, receiving the first signal and the second signal, processing information associated with the first signal and the second signal, and generating a third signal based on at least information associated with the first signal and the second signal. Moreover, the method includes processing information associated with the third signal and the sensed signal, generating a comparison signal based on at least information associated with the third signal and the sensed signal, receiving at least the comparison signal, and generating a modulation signal based on at least information associated with the comparison signal. Also, the method includes receiving the modulation signal, and outputting a drive signal based on at least information associated with the modulation signal. The drive signal is associated with at least one or more switching periods, and each of the one or more switching periods includes at least an on-time period for the switch and a demagnetization period for a demagnetization process. The process for processing information associated with the sensed signal includes, for each of the one or more switching periods, sampling the sensed signal at the middle of the on-time period, and holding the sampled sensed signal representing the inductor current at the middle of the on-time period. For each of the one or more switching periods, the first signal represents a sum of a first multiplication result and a second multiplication result generated based on at least information associated with the held and sampled sensed signal, and the second signal represents the switching period multiplied by a predetermined current magnitude. The process for processing information associated with the first signal and the second signal includes integrating period-by-period differences between the first signal and the second signal for a plurality of switching periods, and the third signal represents the integrated period-by-period differences. The integrated period-by-period differences are smaller than a predetermined threshold in magnitude.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for providing at least an output current to one or more light emitting diodes, the system comprising:
    a transconductance amplifier configured to receive a sensed signal and also receive a predetermined voltage signal through a first switch, the sensed signal being associated with an inductor current flowing through an inductor coupled to a second switch, the transconductance amplifier being further configured to generate a current signal;
    a capacitor coupled to the transconductance amplifier and configured to generate a first voltage signal;
    a multiplier component configured to process information associated with the first voltage signal and a second voltage signal and generate a multiplication signal based on at least information associated with the first voltage signal and the second voltage signal;
    a comparator configured to receive the multiplication signal and the sensed signal and generate a comparison signal based on at least information associated with the multiplication signal and the sensed signal;
    a modulation-signal generator configured to receive at least the comparison signal and generate a modulation signal; and
    a gate driver configured to receive the modulation signal and output a drive signal to the second switch;
    wherein:
        the drive signal is associated with at least one or more switching periods, each of the one or more switching periods including at least an on-time period for the second switch;
        the transconductance amplifier is further configured to, for each of the one or more switching periods, receive at least the predetermined voltage signal during only the on-time period for the second switch; and
        the current signal is configured to charge or discharge the capacitor.

2. The system of claim 1 wherein:
    the transconductance amplifier, the multiplier component, the comparator, the modulation-signal generator, and the gate driver are located on a chip; and
    the capacitor is located off the chip.

3. The system of claim 1 is configured to regulate an output current at a predetermined constant level in a critical conduction mode.

4. The system of claim 3 is further configured to achieve a power factor that is equal to or larger than 0.9 in the critical conduction mode.

5. A method for providing at least an output current to one or more light emitting diodes, the method comprising:
    receiving at least a sensed signal, the sensed signal being associated with an inductor current flowing through an inductor coupled to a switch;
    processing information associated with the sensed signal and a predetermined voltage signal;
    generating a current signal based on at least information associated with the sensed signal and the predetermined voltage signal;
    processing information associated with the current signal;
    generating a first voltage signal, by at least a capacitor, based on at least information associated with the current signal;

processing information associated with the first voltage signal and a second voltage signal;

generating a multiplication signal based on at least information associated with the first voltage signal and the second voltage signal;

receiving the multiplication signal and the sensed signal;

generating a comparison signal based on at least information associated with the multiplication signal and the sensed signal;

receiving at least the comparison signal;

generating a modulation signal based on at least information associated with the comparison signal;

receiving the modulation signal; and outputting a drive signal to the switch, the drive signal being based on at least information associated with the modulation signal;

wherein:
- the drive signal is associated with at least one or more switching periods, each of the one or more switching periods including at least an on-time period for the switch;
- the process for receiving at least a sensed signal includes, for each of the one or more switching periods, receiving at least the predetermined voltage signal during only the on-time period for the switch; and
- wherein the process for processing information associated with the current signal includes charging or discharging the capacitor with the current signal.

\* \* \* \* \*